(12) United States Patent
Gass

(10) Patent No.: US 7,055,417 B1
(45) Date of Patent: Jun. 6, 2006

(54) SAFETY SYSTEM FOR POWER EQUIPMENT

(75) Inventor: Stephen F. Gass, Wilsonville, OR (US)

(73) Assignee: SD3, LLC, Wilsonville, OR (US)

( * ) Notice: Subject to any disclaimer, the term of this patent is extended or adjusted under 35 U.S.C. 154(b) by 0 days.

(21) Appl. No.: 09/676,190

(22) Filed: Sep. 29, 2000

Related U.S. Application Data

(60) Provisional application No. 60/157,340, filed on Oct. 1, 1999, provisional application No. 60/182,866, filed on Feb. 16, 2000.

(51) Int. Cl.
  *B26D 5/00* (2006.01)
  *B26D 1/14* (2006.01)
(52) U.S. Cl. .................. 83/58; 83/62.1; 83/DIG. 1; 83/477.1; 83/490; 83/76.7
(58) Field of Classification Search .................. 83/62.1, 83/58, DIG. 1, 526.72, 76.8, 471.2, 473, 83/397, 477, 1, 485, 487, 490, 491, 522.12, 83/544, 546, 564, 581, 590, 665, 76.7; 192/130, 192/129 R, 144, 148, 131 R, 131 H, 134, 192/133, 138; 340/679, 530, 540, 521.1, 340/573.1, 680, 538; 318/538, 362, 366, 318/454, 551, 491; 144/329, 363, 391, 401, 144/252, 420, 421, 356; 324/76.11, 672; 326/21; 411/3, 29, 390; 307/142, 114, 131; 56/10.4, 11.3; 30/382, 381
See application file for complete search history.

(56) References Cited

U.S. PATENT DOCUMENTS

| | | |
|---|---|---|
| 0,146,886 A | 1/1874 | Doane et al. |
| 162,814 A | 5/1875 | Graves et al. |
| 264,412 A | 9/1882 | Kuhlmann |
| 261,090 A | 11/1882 | Grill |
| 299,480 A | 5/1884 | Kuhlmann et al. |
| 302,041 A | 7/1884 | Sill |
| 307,112 A | 10/1884 | Groff |

(Continued)

FOREIGN PATENT DOCUMENTS

AT  76186  4/1919

(Continued)

OTHER PUBLICATIONS

Gordon Engineering Corp., Product Catalog, Oct. 1997, Brookfield, CT, USA.

(Continued)

*Primary Examiner*—Boyer D. Ashley

(57) ABSTRACT

Safety systems for power equipment are disclosed. The safety systems include a detection system adapted to detect contact between a person and a working portion of a machine, where the detection system is adapted to capacitively impart an electric charge on the working portion and to detect when that charge drops; and a reaction system associated with the detection system to cause a predetermined action to take place relative to the working portion upon detection of contact between the person and the working portion by the detection system. Machines equipped with safety systems are also disclosed, such as saws, jointers, etc. The machines include a working portion, such as a cutter or blade, a detection system adapted to detect a dangerous condition between a person and the working portion, and a reaction system associated with the detection system to cause a predetermined action to take place upon detection of the dangerous condition, such as a brake system to stop the working portion, a retraction system to retract the working portion, or a system to cover the working portion. The machines may include a control system adapted to control the operability of one or more of the working portion, the detection system and the reaction system.

11 Claims, 13 Drawing Sheets

U.S. PATENT DOCUMENTS

| | | | |
|---|---|---|---|
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 1,427,005 A | 8/1922 | McMichael |
| 1,430,983 A | 10/1922 | Granberg |
| 1,464,924 A | 8/1923 | Drummond |
| 1,465,224 A | 8/1923 | Lantz |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,600,604 A | 9/1926 | Sorlien |
| 1,616,478 A | 2/1927 | Watson |
| 1,640,517 A | 8/1927 | Procknow |
| 1,662,372 A | 3/1928 | Ward |
| 1,701,948 A | 2/1929 | Crowe |
| 1,711,490 A | 5/1929 | Drummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,904,005 A | 4/1933 | Masset |
| 1,988,102 A | 1/1935 | Woodward |
| 1,993,219 A | 3/1935 | Merrigan |
| 2,010,851 A | 8/1935 | Drummond |
| 2,075,282 A | 3/1937 | Hedgpeth |
| 2,095,330 A | 10/1937 | Hedgpeth |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A * | 5/1941 | MacMillin et al. ......... 192/130 |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,402,232 A | 6/1946 | Baker |
| 2,425,331 A | 8/1947 | Kramer |
| 2,434,174 A | 1/1948 | Morgan |
| 2,452,589 A | 11/1948 | McWhirter et al. |
| 2,466,325 A | 4/1949 | Ocenasek |
| 2,496,613 A | 2/1950 | Woodward |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,722,246 A * | 11/1955 | Arnoldy ...................... 30/391 |
| 2,731,049 A | 1/1956 | Akin |
| 2,736,348 A * | 2/1956 | Nelson ...................... 83/62.1 |
| 2,737,213 A | 3/1956 | Richards et al. |
| 2,758,615 A | 8/1956 | Mastriforte |
| 2,785,710 A | 3/1957 | Mowery, Jr. |
| 2,786,496 A | 3/1957 | Eschenburg |
| 2,810,408 A | 10/1957 | Boice et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,883,486 A | 4/1959 | Mason |
| 2,894,546 A | 7/1959 | Eschenburg |
| 2,913,025 A | 11/1959 | Richards |
| 2,945,513 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vilkaitis |
| 2,984,268 A | 5/1961 | Vuichard |
| 2,991,593 A | 7/1961 | Cohen |
| 3,005,477 A | 10/1961 | Sherwen |
| 3,011,529 A | 12/1961 | Copp |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,035,995 A | 5/1962 | Seeley et al. |
| 3,047,116 A | 7/1962 | Stiebel et al. |
| 3,085,602 A | 4/1963 | Gaskell |
| 3,105,530 A | 10/1963 | Peterson |
| 3,129,731 A | 4/1964 | Tyrell |
| 3,163,732 A | 12/1964 | Abbott |
| 3,184,001 A | 5/1965 | Reinsch et al. |
| 3,186,256 A | 6/1965 | Reznick |
| 3,207,273 A | 9/1965 | Jurin |
| 3,224,474 A | 12/1965 | Bloom |
| 3,232,326 A | 2/1966 | Speer et al. |
| 3,246,205 A | 4/1966 | Miller |
| 3,249,134 A | 5/1966 | Vogl et al. |
| 3,306,149 A | 2/1967 | John |
| 3,313,185 A | 4/1967 | Drake et al. |
| 3,315,715 A | 4/1967 | Mytinger |
| 3,323,814 A | 6/1967 | Phillips |
| 3,337,008 A | 8/1967 | Trachte |
| 3,356,111 A | 12/1967 | Mitchell |
| 3,386,322 A | 6/1968 | Stone et al. |
| 3,439,183 A | 4/1969 | Hurst, Jr. |
| 3,454,286 A | 7/1969 | Anderson et al. |

| | | | | | | |
|---|---|---|---|---|---|---|
| 3,538,964 A | 11/1970 | Warrick et al. | | 4,418,597 A | 12/1983 | Krusemark et al. |
| 3,540,338 A | 11/1970 | McEwan et al. | | 4,466,233 A | 8/1984 | Thesman |
| 3,554,067 A | 1/1971 | Scutella | | 4,470,046 A | 9/1984 | Betsill |
| 3,566,996 A | 3/1971 | Crossman | | 4,510,489 A | 4/1985 | Anderson, III et al. |
| 3,580,376 A | 5/1971 | Loshbough | | 4,512,224 A * | 4/1985 | Terauchi ..................... 82/48 |
| 3,581,784 A | 6/1971 | Warrick | | 4,518,043 A * | 5/1985 | Anderson et al. ............. 172/6 |
| 3,613,748 A * | 10/1971 | De Pue ........................ 30/391 | | 4,532,501 A | 7/1985 | Hoffman |
| 3,670,788 A | 6/1972 | Pollak et al. | | 4,557,168 A | 12/1985 | Tokiwa |
| 3,675,444 A | 7/1972 | Whipple | | 4,560,033 A * | 12/1985 | DeWoody et al. .......... 188/2 F |
| 3,680,609 A | 8/1972 | Menge | | 4,566,512 A | 1/1986 | Wilson |
| 3,688,815 A | 9/1972 | Ridenour | | 4,573,556 A | 3/1986 | Andreasson |
| 3,695,116 A | 10/1972 | Baur | | 4,576,073 A | 3/1986 | Stinson |
| 3,696,844 A | 10/1972 | Bernatschek | | 4,589,047 A | 5/1986 | Gaus et al. |
| 3,745,546 A | 7/1973 | Stuger et al. | | 4,589,860 A | 5/1986 | Brandenstein et al. |
| 3,749,933 A | 7/1973 | Davidson | | 4,599,597 A | 7/1986 | Rotbart |
| 3,754,493 A | 8/1973 | Niehaus et al. | | 4,606,251 A | 8/1986 | Boileau |
| 3,772,590 A | 11/1973 | Mikulecky et al. | | 4,615,247 A | 10/1986 | Berkeley |
| 3,785,230 A | 1/1974 | Lokey | | 4,621,300 A | 11/1986 | Summerer |
| 3,805,639 A * | 4/1974 | Peter ........................ 74/616 | | 4,625,604 A | 12/1986 | Handler et al. |
| 3,805,658 A | 4/1974 | Scott et al. | | 4,637,188 A | 1/1987 | Crothers |
| 3,808,932 A | 5/1974 | Russell | | 4,637,289 A | 1/1987 | Ramsden |
| 3,829,850 A | 8/1974 | Guetersloh | | 4,644,832 A | 2/1987 | Smith |
| 3,858,095 A | 12/1974 | Friemann et al. | | 4,653,189 A | 3/1987 | Andreasson |
| 3,861,016 A | 1/1975 | Johnson et al. | | 4,657,428 A | 4/1987 | Wiley |
| 3,863,208 A | 1/1975 | Balban | | 4,672,500 A | 6/1987 | Tholome et al. |
| 3,880,032 A | 4/1975 | Green | | 4,679,719 A | 7/1987 | Kramer |
| 3,882,744 A | 5/1975 | McCarroll | | 4,722,021 A | 1/1988 | Hornung et al. |
| 3,886,413 A | 5/1975 | Dow et al. | | 4,751,603 A | 6/1988 | Kwan |
| 3,889,567 A | 6/1975 | Sato et al. | | 4,756,220 A | 7/1988 | Olsen et al. |
| 3,922,785 A * | 12/1975 | Fushiya ........................ 30/391 | | 4,757,881 A | 7/1988 | Jonsson et al. |
| 3,924,688 A | 12/1975 | Cooper et al. | | 4,792,965 A | 12/1988 | Morgan |
| 3,931,727 A | 1/1976 | Luenser | | 4,805,504 A | 2/1989 | Fushiya et al. |
| 3,935,777 A | 2/1976 | Bassett | | 4,840,135 A | 6/1989 | Yamauchi |
| 3,945,286 A | 3/1976 | Smith | | 4,864,455 A | 9/1989 | Shimomura et al. |
| 3,946,631 A | 3/1976 | Malm | | 4,875,398 A | 10/1989 | Taylor et al. |
| 3,947,734 A | 3/1976 | Fyler | | 4,896,607 A | 1/1990 | Hall et al. |
| 3,949,636 A | 4/1976 | Ball et al. | | 4,906,962 A | 3/1990 | Duimstra |
| 3,953,770 A | 4/1976 | Hayashi | | 4,934,233 A | 6/1990 | Brundage et al. |
| 3,967,161 A | 6/1976 | Lichtblau | | 4,936,876 A | 6/1990 | Reyes |
| 3,974,565 A | 8/1976 | Ellis | | 4,937,554 A | 6/1990 | Herman |
| 3,975,600 A | 8/1976 | Marston | | 4,965,909 A | 10/1990 | McCullough et al. |
| 3,994,192 A | 11/1976 | Faig | | 4,975,798 A | 12/1990 | Edwards et al. |
| 4,007,679 A | 2/1977 | Edwards | | 5,020,406 A | 6/1991 | Sasaki et al. |
| 4,016,490 A | 4/1977 | Weckenmann et al. | | 5,025,175 A | 6/1991 | Dubois, III |
| 4,026,174 A | 5/1977 | Fierro | | 5,046,426 A | 9/1991 | Julien et al. |
| 4,026,177 A | 5/1977 | Lokey | | 5,052,255 A | 10/1991 | Gaines |
| 4,029,159 A | 6/1977 | Nymann | | 5,074,047 A | 12/1991 | King |
| 4,047,156 A | 9/1977 | Atkins | | 5,081,406 A | 1/1992 | Hughes et al. |
| 4,048,886 A | 9/1977 | Zettler | | 5,082,316 A | 1/1992 | Wardlaw |
| 4,060,160 A | 11/1977 | Lieber | | 5,083,973 A | 1/1992 | Townsend |
| 4,070,940 A | 1/1978 | McDaniel et al. | | 5,086,890 A | 2/1992 | Turczyn et al. |
| 4,075,961 A | 2/1978 | Harris | | 5,094,000 A | 3/1992 | Becht et al. |
| 4,077,161 A | 3/1978 | Wyle et al. | | 5,119,555 A | 6/1992 | Johnson |
| 4,085,303 A | 4/1978 | McIntyre et al. | | 5,122,091 A | 6/1992 | Townsend |
| 4,090,345 A | 5/1978 | Harkness | | 5,174,349 A | 12/1992 | Svetlik et al. |
| 4,091,698 A | 5/1978 | Obear et al. | | 5,184,534 A | 2/1993 | Lee |
| 4,106,378 A | 8/1978 | Kaiser | | 5,198,702 A | 3/1993 | McCullough et al. |
| 4,117,752 A | 10/1978 | Yoneda | | 5,199,343 A | 4/1993 | OBanion |
| 4,145,940 A * | 3/1979 | Woloveke et al. ............. 83/68 | | 5,201,684 A | 4/1993 | Dubois, III |
| 4,152,833 A | 5/1979 | Phillips | | 5,207,253 A | 5/1993 | Hoshino et al. |
| 4,161,649 A | 7/1979 | Klos et al. | | 5,212,621 A | 5/1993 | Panter |
| 4,175,452 A | 11/1979 | Idel | | 5,218,189 A | 6/1993 | Hutchison |
| 4,190,000 A | 2/1980 | Shaull et al. | | 5,231,359 A | 7/1993 | Masuda et al. |
| 4,195,722 A | 4/1980 | Anderson et al. | | 5,231,906 A | 8/1993 | Kogej |
| 4,199,930 A | 4/1980 | Lebet et al. | | 5,239,978 A | 8/1993 | Plangetis |
| 4,249,117 A | 2/1981 | Leukhardt et al. | | 5,245,879 A | 9/1993 | McKeon |
| 4,262,278 A | 4/1981 | Howard et al. | | 5,257,570 A | 11/1993 | Shiotani et al. |
| 4,267,914 A | 5/1981 | Saar | | 5,265,510 A | 11/1993 | Hoyer-Ellefsen |
| 4,291,794 A | 9/1981 | Bauer | | 5,272,946 A | 12/1993 | McCullough et al. |
| 4,305,442 A | 12/1981 | Currie | | 5,276,431 A | 1/1994 | Piccoli et al. |
| 4,321,841 A | 3/1982 | Felix | | 5,285,708 A * | 2/1994 | Bosten et al. ................. 83/520 |
| 4,372,202 A | 2/1983 | Cameron | | 5,320,382 A | 6/1994 | Goldstein et al. |
| 4,391,358 A | 7/1983 | Haeger | | 5,321,230 A | 6/1994 | Shanklin et al. |

| | | | | | | |
|---|---|---|---|---|---|---|
| 5,331,875 | A | 7/1994 | Mayfield | 6,460,442 B1 | 10/2002 | Talesky et al. |
| 5,353,670 | A | 10/1994 | Metzger, Jr. | 6,471,106 B1 | 10/2002 | Reining |
| 5,377,554 | A | 1/1995 | Reulein et al. | 6,479,958 B1 | 11/2002 | Thompson et al. |
| 5,377,571 | A * | 1/1995 | Josephs ............... 83/399 | D466,913 S | 12/2002 | Ceroll et al. |
| 5,392,678 | A | 2/1995 | Sasaki et al. | 6,492,802 B1 | 12/2002 | Bielski |
| 5,401,928 | A | 3/1995 | Kelley | D469,354 S | 1/2003 | Curtsinger |
| 5,411,221 | A | 5/1995 | Collins et al. | 6,502,493 B1 | 1/2003 | Eccardt et al. |
| 5,451,750 | A | 9/1995 | An | 6,536,536 B1 | 3/2003 | Gass et al. |
| 5,453,903 | A | 9/1995 | Chow | 6,543,324 B1 | 4/2003 | Dils |
| 5,471,888 | A | 12/1995 | McCormick | 6,546,835 B1 | 4/2003 | Wang |
| 5,480,009 | A | 1/1996 | Wieland et al. | 6,575,067 B1 | 6/2003 | Parks et al. |
| 5,503,059 | A | 4/1996 | Pacholok | 6,578,460 B1 | 6/2003 | Sartori |
| 5,510,685 | A | 4/1996 | Grasselli | 6,578,856 B1 | 6/2003 | Kahle |
| 5,513,548 | A | 5/1996 | Garuglieri | 6,595,096 B1 | 7/2003 | Ceroll et al. |
| 5,534,836 | A | 7/1996 | Schenkel et al. | D478,917 S | 8/2003 | Ceroll et al. |
| 5,572,916 | A | 11/1996 | Takano | 6,601,493 B1 | 8/2003 | Crofutt |
| 5,587,618 | A | 12/1996 | Hathaway | 6,607,015 B1 | 8/2003 | Chen |
| 5,592,353 | A | 1/1997 | Shinohara et al. | D479,538 S | 9/2003 | Welsh et al. |
| 5,606,889 | A | 3/1997 | Bielinski et al. | 6,617,720 B1 | 9/2003 | Egan, III et al. |
| 5,623,860 | A | 4/1997 | Schoene et al. | 6,619,348 B1 | 9/2003 | Wang |
| 5,648,644 | A | 7/1997 | Nagel | 6,640,683 B1 | 11/2003 | Lee |
| 5,659,454 | A | 8/1997 | Vermesse | 6,644,157 B1 | 11/2003 | Huang |
| 5,667,152 | A | 9/1997 | Mooring | 6,647,847 B1 | 11/2003 | Hewitt et al. |
| 5,671,633 | A | 9/1997 | Wagner | 6,659,233 B1 | 12/2003 | DeVlieg |
| 5,695,306 | A | 12/1997 | Nygren, Jr. | 6,736,042 B1 | 5/2004 | Behne et al. |
| 5,700,165 | A | 12/1997 | Harris et al. | 6,742,430 B1 | 6/2004 | Chen |
| 5,724,875 | A | 3/1998 | Meredith et al. | 6,826,988 B1 | 12/2004 | Gass et al. |
| 5,730,165 | A | 3/1998 | Philipp | 6,857,345 B1 | 2/2005 | Gass et al. |
| 5,741,048 | A | 4/1998 | Eccleston | 6,874,397 B1 | 4/2005 | Chang |
| 5,755,148 | A | 5/1998 | Stumpf et al. | 6,874,399 B1 | 4/2005 | Lee |
| 5,771,742 | A | 6/1998 | Bokaie et al. | 2001/0032534 A1 | 10/2001 | Cerroll et al. |
| 5,782,001 | A * | 7/1998 | Gray ............... 30/391 | 2002/0017179 A1* | 2/2002 | Gass et al. .............. 83/58 |
| 5,787,779 | A | 8/1998 | Garuglieri | 2002/0017181 A1* | 2/2002 | Gass et al. .............. 83/58 |
| 5,791,057 | A * | 8/1998 | Nakamura et al. ...... 30/381 | 2002/0017184 A1* | 2/2002 | Gass et al. .............. 83/58 |
| 5,791,223 | A | 8/1998 | Lanzer | 2002/0020265 A1* | 2/2002 | Gass et al. .............. 83/62.1 |
| 5,791,224 | A | 8/1998 | Suzuki et al. | 2002/0056348 A1* | 5/2002 | Gass et al. .............. 86/62.1 |
| 5,791,441 | A | 8/1998 | Matos et al. | 2002/0056349 A1* | 5/2002 | Gass et al. .............. 86/62.1 |
| 5,819,619 | A | 10/1998 | Miller et al. | 2002/0059853 A1* | 5/2002 | Gass et al. .............. 86/62 |
| 5,852,951 | A | 12/1998 | Santi | 2002/0096030 A1 | 7/2002 | Wang |
| 5,861,809 | A | 1/1999 | Eckstein et al. | 2002/0109036 A1 | 8/2002 | Denen et al. |
| 5,875,698 | A | 3/1999 | Ceroll et al. | 2002/0170399 A1* | 11/2002 | Gass et al. .............. 83/62.1 |
| 5,921,367 | A | 7/1999 | Kashioka et al. | 2003/0037655 A1 | 2/2003 | Chin-Chin |
| 5,930,096 | A | 7/1999 | Kim | 2003/0074873 A1* | 4/2003 | Frieberg et al. .............. 56/10.4 |
| 5,937,720 | A | 8/1999 | Itzov | 2003/0089212 A1 | 5/2003 | Parks et al. |
| 5,942,975 | A | 8/1999 | Sorensen | 2003/0101857 A1 | 6/2003 | Chuang |
| 5,943,932 | A | 8/1999 | Sbereveglieri | 2003/0109798 A1 | 6/2003 | Kermani |
| 5,950,514 | A | 9/1999 | Benedict et al. | 2004/0011177 A1 | 1/2004 | Huang |
| 5,963,173 | A | 10/1999 | Lian et al. | 2004/0060404 A1 | 4/2004 | Metzger, Jr. |
| 5,974,927 | A | 11/1999 | Tsune | 2004/0104085 A1 | 6/2004 | Lang et al. |
| 5,989,116 | A | 11/1999 | Johnson et al. | 2004/0159198 A1 | 8/2004 | Peot et al. |
| 6,018,284 | A | 1/2000 | Rival et al. | 2004/0194594 A1 | 10/2004 | Dils et al. |
| 6,037,729 | A | 3/2000 | Woods et al. | 2004/0200329 A1 | 10/2004 | Sako |
| 6,052,884 | A | 4/2000 | Steckler et al. | 2004/0226424 A1 | 11/2004 | O'Banion et al. |
| 6,095,092 | A | 8/2000 | Chou | 2004/0226800 A1 | 11/2004 | Pierga et al. |
| 6,119,984 | A | 9/2000 | Devine | 2005/0057206 A1 | 3/2005 | Uneyama |
| 6,133,818 | A | 10/2000 | Hsieh et al. | 2005/0092149 A1 | 5/2005 | Hartmann |
| 6,141,192 | A | 10/2000 | Garzon | 2005/0139051 A1 | 6/2005 | Gass et al. |
| 6,148,504 | A * | 11/2000 | Schmidt et al. ........... 29/708 | 2005/0139056 A1 | 6/2005 | Gass et al. |
| 6,150,826 | A | 11/2000 | Hokodate et al. | 2005/0139057 A1 | 6/2005 | Gass et al. |
| 6,170,370 | B1 | 1/2001 | Sommerville | 2005/0139058 A1 | 6/2005 | Gass et al. |
| 6,257,061 | B1 | 7/2001 | Nonoyama et al. | 2005/0139459 A1 | 6/2005 | Gass et al. |
| 6,352,137 | B1 | 3/2002 | Stegall et al. | | | |
| 6,366,099 | B1 | 4/2002 | Reddi | | | |
| 6,376,939 | B1 | 4/2002 | Suzuki et al. | | | |
| 6,404,098 | B1 | 6/2002 | Kayama et al. | | | |
| 6,405,624 | B1 | 6/2002 | Sutton | | | |
| 6,418,829 | B1 | 7/2002 | Pilchowski | | | |
| 6,420,814 | B1 | 7/2002 | Bobbio | | | |
| 6,427,570 | B1 | 8/2002 | Miller et al. | | | |
| 6,430,007 | B1 | 8/2002 | Jabbari | | | |
| 6,431,425 | B1 | 8/2002 | Moorman et al. | | | |
| 6,450,077 | B1 | 9/2002 | Ceroll et al. | | | |
| 6,453,786 | B1 | 9/2002 | Ceroll et al. | | | |

FOREIGN PATENT DOCUMENTS

| | | |
|---|---|---|
| DE | 2800403 | 7/1979 |
| DE | 3427733 A1 * | 1/1986 |
| DE | 4235161 | 5/1993 |
| DE | 4326313 | 2/1995 |
| DE | 19609771 | 6/1998 |
| EP | 0146460 | 6/1985 |
| EP | 0362937 A2 | 4/1990 |

| | | |
|---|---|---|
| ES | 2152184 | 1/2001 |
| FR | 2556643 | 6/1985 |
| FR | 2570017 | 3/1986 |
| GB | 598204 | 2/1948 |
| GB | 2142571 A * | 1/1985 |
| SU | 297525 | 6/1954 |

OTHER PUBLICATIONS

*You Should Have Invented It*, French television show video, undated.

* cited by examiner

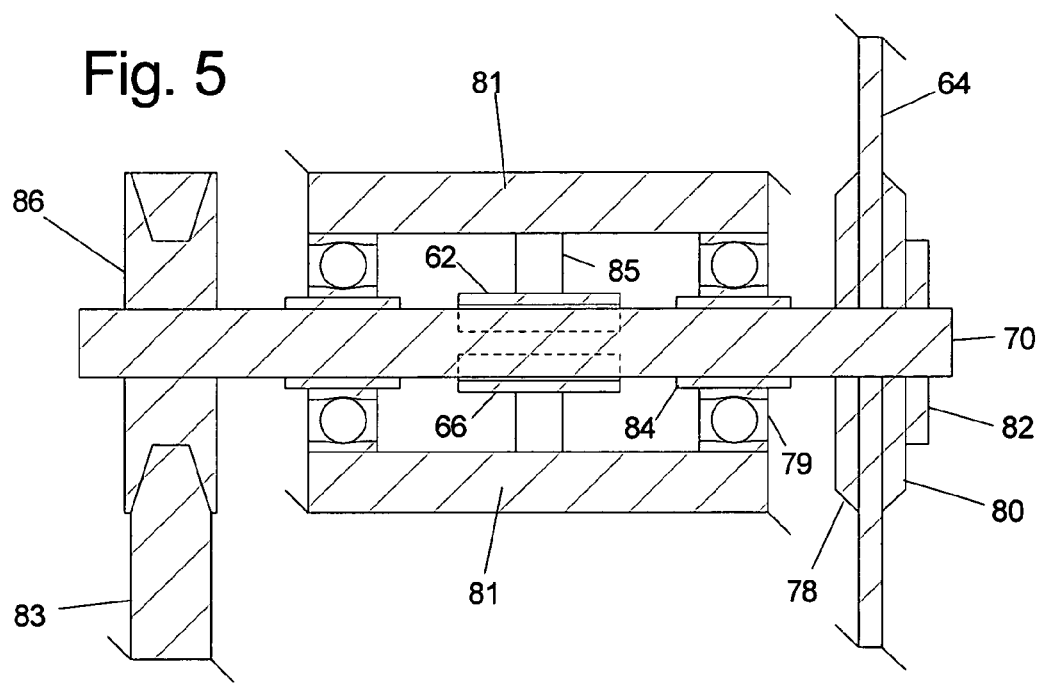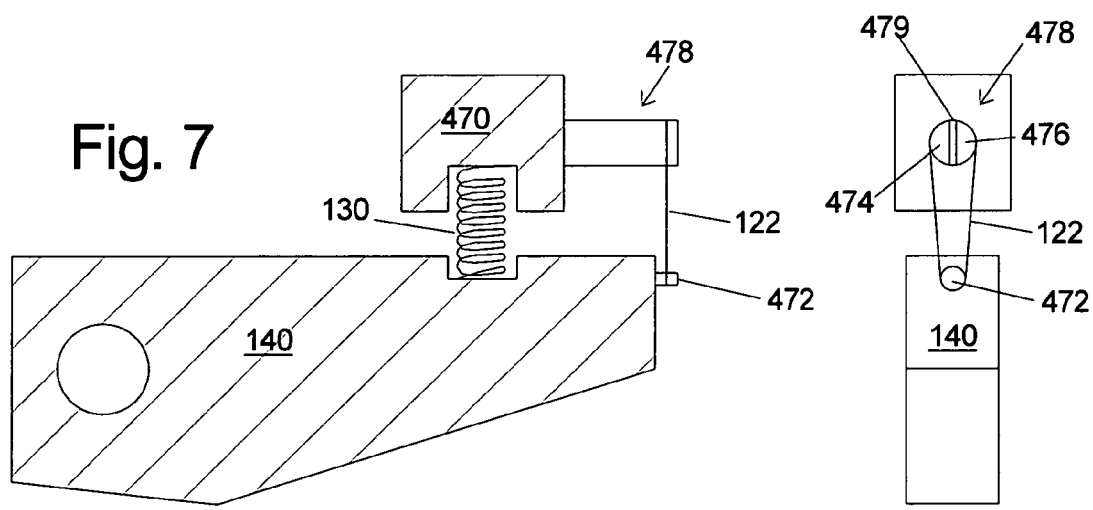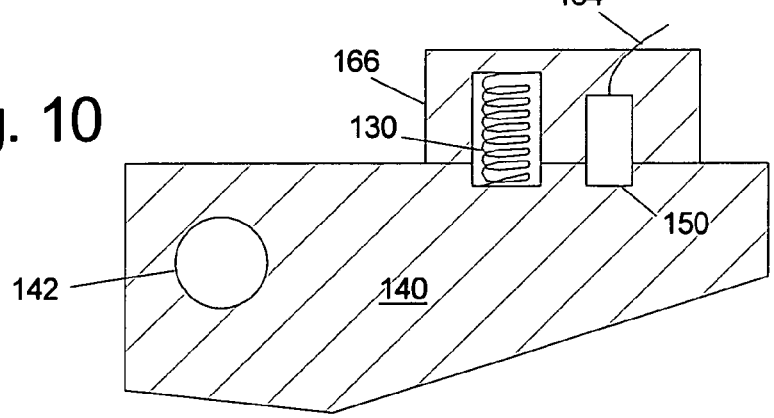

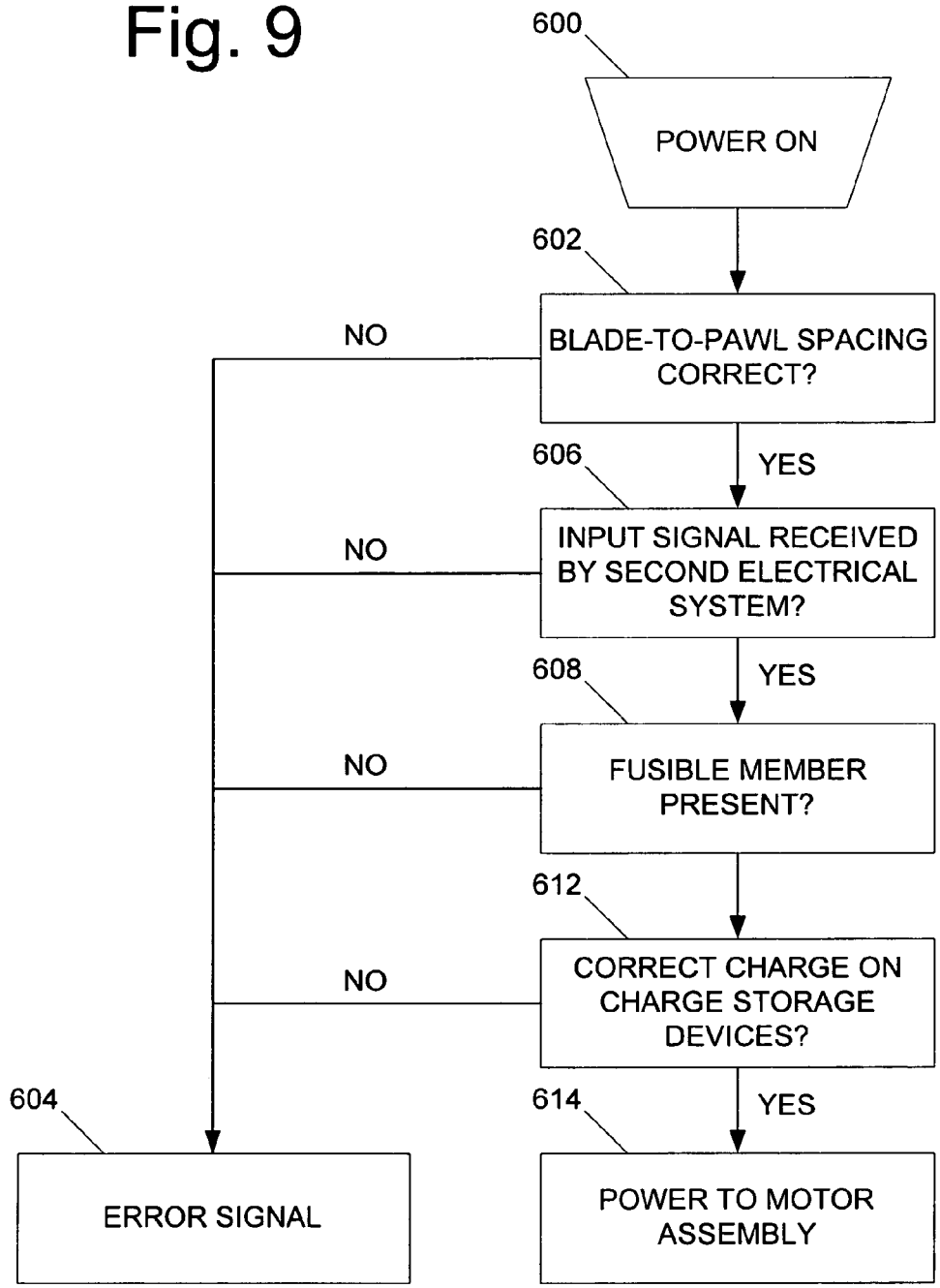

SAFETY SYSTEM FOR POWER EQUIPMENT

CROSS-REFERENCE TO RELATED APPLICATIONS

This application claims the benefit of and priority from U.S. Provisional Patent Application Ser. No. 60/157,340, filed Oct. 1, 1999 and U.S. Provisional Patent Application Ser. No. 60/182,866, filed Feb. 16, 2000, both of which are hereby incorporated by reference.

FIELD OF THE INVENTION

The present invention relates to safety systems and more particularly to a high-speed safety stop for use on power equipment.

BACKGROUND OF THE INVENTION

Beginning with the industrial revolution and continuing to the present, mechanized equipment has allowed workers to produce goods with greater speed and less effort than possible with manually-powered tools. Unfortunately, the power and high operating speeds of mechanized equipment creates a risk for those operating such machinery. Each year thousands of people are maimed or killed by accidents involving power equipment.

As might be expected, many systems have been developed to minimize the risk of injury when using power equipment. Probably the most common safety feature is a guard that physically blocks an operator from making contact with dangerous components of machinery, such as belts, shafts or blades. In many cases, guards are effective to reduce the risk of injury, however, there are many instances where the nature of the operations to be performed precludes using a guard that completely blocks access to hazardous machine parts.

Various systems have been proposed to prevent accidental injury where guards cannot effectively be employed. For instance, U.S. Pat. Nos. 941,726, 2,978,084, 3,011,610, 3,047,116, 4,195,722 and 4,321,841, the disclosures of which are incorporated herein by reference, all disclose safety systems for use with power presses. These systems utilize cables attached to the wrists of the operator that either pull back a user's hands from the work zone upon operation or prevent operation until the user's hands are outside the danger zone. U.S. Pat. Nos. 3,953,770, 4,075,961, 4,470,046, 4,532,501 and 5,212,621, the disclosures of which are incorporated herein by reference, disclose radio-frequency safety systems which utilize radio-frequency signals to detect the presence of a user's hand in a dangerous area of the machine and thereupon prevent or interrupt operation of the machine.

U.S. Pat. Nos. 4,959,909, 5,025,175, 5,122,091, 5,198,702, 5,201,684, 5,272,946, and 5,510,685 disclose safety systems for use with meat-skinning equipment, and are incorporated herein by reference. These systems interrupt or reverse power to the motor, or disengage a clutch, upon contact with a user's hand by any dangerous portion of the machine. Typically, contact between the user and the machine is detected by monitoring for electrical contact between a fine wire mesh in a glove worn by the user and some metal component in the dangerous area of the machine. Although such systems are suitable for use with meat skinning machines, they are relatively slow to stop the motion of the cutting element because they rely on the operation of solenoids or must overcome the inertia of the motor. However, because these systems operate at relatively low speeds, the blade does not need to be stopped rapidly to prevent serious injury to the user.

U.S. Pat. Nos. 3,785,230 and 4,026,177, the disclosures of which are herein incorporated by reference, disclose a safety system for use on circular saws to stop the blade when a user's hand approaches the blade. The system uses the blade as an antenna in an electromagnetic proximity detector to detect the approach of a user's hand prior to actual contact with the blade. Upon detection of a user's hand, the system engages a brake using a standard solenoid. Unfortunately, such a system is prone to false triggers and is relatively slow acting because of the solenoid. U.S. Pat. No. 4,117,752, which is herein incorporated by reference, discloses a similar braking system for use with a band saw, where the brake is triggered by actual contact between the user's hand and the blade. However, the system described for detecting blade contact does not appear to be functional to accurately and reliably detect contact. Furthermore, the system relies on standard electromagnetic brakes operating off of line voltage to stop the blade and pulleys of the band saw. It is believed that such brakes would take 50 ms–1 s to stop the blade. Therefore, the system is too slow to stop the blade quickly enough to avoid serious injury.

None of these existing systems have operated with sufficient speed and/or reliability to prevent serious injury with many types of commonly used power tools. Although proximity-type sensors can be used with some equipment to increase the time available to stop the moving pieces, in many cases the user's hands must be brought into relatively close proximity to the cutting element in the normal course of operation. For example, many types of woodworking equipment require that the user's hands pass relatively close to the cutting tools. As a result, existing proximity-type sensors, which are relatively imprecise, have not proven effective with this type of equipment. Even where proximity sensors are practical, existing brake systems have not operated quickly enough to prevent serious injury in many cases.

In equipment where proximity-type detection have not proven effective, the cutting tool must stop very quickly in the event of user contact to avoid serious injury. By way of example, a user may feed a piece of wood through a table saw at a rate of approximately one foot per second. Assuming an average reaction time of approximately one-tenth of a second, the hand may have moved well over an inch before the user even detects the contact. This distance is more than sufficient to result in the loss of several digits, severing of vital vessels and tendons, or even complete severing of a hand. If a brake is triggered immediately upon contact with the saw's blade, the blade must be stopped within approximately one-hundredth of a second to limit the depth of injury to one-eighth of an inch. Standard solenoids or other electromagnetic devices are generally not designed to act in this time scale, particularly where significant force must be generated. For instance, in the case of solenoids or electromagnetic brakes that operate on 60 hz electrical power, it is possible that the power line will be at a phase that has low voltage at the time the brake is triggered and several milliseconds may elapse before the voltage reaches a sufficient level even to begin physical displacement of the brake, much less achieve a complete stoppage of the blade or cutting tool.

BRIEF DESCRIPTION OF THE DRAWINGS

FIG. 5 is a sectional view of an alternative charge plate configuration according to the present invention.

FIG. 7 is a side elevation showing an alternative arrangement of a fusible member according to the present invention.

FIG. 8 is a front elevation of the alternative arrangement of FIG. 7.

FIG. 9 is a flowchart illustrating an exemplary control logic power-on sequence according to the present invention.

FIG. 10 is a detailed sectional view of an alternative brake system using an explosive charge according to the present invention.

DETAILED DESCRIPTION AND BEST MODE OF THE INVENTION

Figure 1:
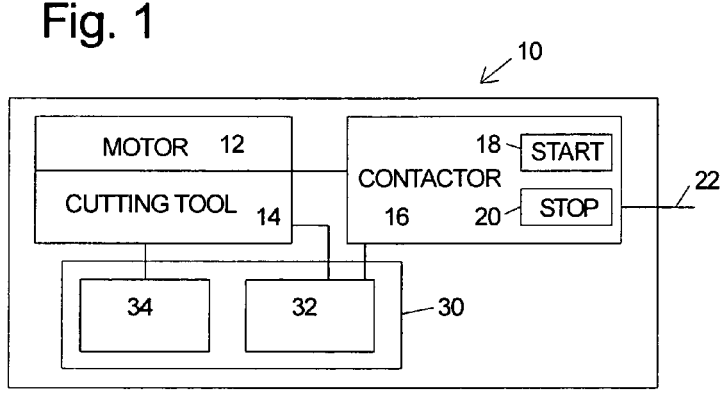
FIG. 1 is a schematic view of a machine with a fast-acting safety stop according to the present invention.

A machine according to the present invention is shown schematically in FIG. 1 and indicated generally at 10. Machine 10 includes a motor assembly 12 adapted to drive a cutting tool 14. Motor assembly 12 includes one or more motors, at least one of which is adapted to drive cutting tool 14. For example, machine 10 may include one or more motors adapted to drive tool 14 as well as one or more motors adapted to feed work pieces, such as wood, into contact with the cutting tool. Cutting tool 14 typically includes one or more blades or other suitable cutting implements that are adapted to cut or remove portions from the work pieces. The particular form of cutting tool 14 will tend to vary depending upon the various embodiments of machine 10. For example, in table saws, chop and miter saws, circular saws and radial arm saws, cutting tool 14 will typically include a circular rotating blade having a plurality of teeth disposed along the perimetrical edge of the blade. For a jointer or planer, the cutting tool includes a plurality of radially spaced-apart blades. For a band saw, the cutting tool includes an elongate, circuitous tooth-edged band.

A controller is disposed between motor assembly 12 and a power source 22, and typically will include one or more switches used to start and stop the operation of the machine. As shown, the controller takes the form of an electromagnetic contactor 16 that includes start and stop switches 18 and 20. An example of a suitable start switch 20 is a momentary contact switch that establishes a circuit to close the contactor upon operation. When the contactor is closed, power is delivered to the motor. The contactor includes an internal switch that maintains the circuit once the contactor is closed. As example of a suitable stop switch 22 is a normally-closed momentary switch that upon operation interrupts the circuit holding the contactor closed, thereby stopping the motor. It will be appreciated that the above description is intended only to provide an illustrative example of such a contactor, and any other suitable actuator for starting and stopping the operation of the machine, such as solid-state devices, may be used.

Machine 10 includes a safety stop 30 that stops the cutting tool abruptly upon contact between the cutting tool and the user's body. As used herein the phrases "virtually instantaneously," "immediately," "instantly," "rapidly," "abruptly," and "suddenly" mean sufficiently quickly to prevent serious injury to a user, such as amputation of one or more of the user's fingers, in the normal course of machine operation (i.e., the user is using the machine as intended, with normal feed rates, etc.). Stopping times of less than 10 milliseconds from initial contact between the cutting tool and the user are preferred, with stopping times of less than 5 milliseconds, or preferably less than 2 milliseconds being more desirable and potentially attainable with the safety stop of the present invention. Alternatively, the stopping times may be longer where such would be sufficient to prevent serious injury under the circumstances of normal use. For example, stopping times of 20, 50 or 100 milliseconds may be sufficient.

As will be described in more detail below, safety stop 30 includes two major subsystems, a contact detection system 32 and a brake system 34. The contact detection system monitors the cutting tool for contact with a user. Upon detection of such contact, system 32 triggers the brake system. In response to actuation by detection system 32, the brake system stops the cutting tool (or takes other action to eliminate the danger of injury) abruptly.

In addition to actuating brake system 34, contact detection system 32 preferably also interrupts the power to the motor assembly, or at least the portion of motor assembly 12 adapted to drive the cutting tool. For example, when machine 10 includes a magnetic contactor, such as described in the above example, the detection system may be adapted to interrupt the circuit holding the magnetic contactor closed so that power to the motor is interrupted. It should be understood that this step is optional, in that interrupting power to the machine's motor assembly is not necessary or sufficient to prevent serious injury to the user when the user touches the machine's cutting tool. Therefore, the principal benefit of this step is to reduce the likelihood of damaging the motor assembly or drive system while the brake system is preventing rotation or other movement of the cutting tool.

It will be appreciated that detection system 32 may employ any one or more of a wide variety of methods for detecting contact or proximity between the cutting tool and a user's body. In view of the relatively high response speed of electronic signals and circuits, one suitable method includes using electrical circuitry to detect an electronic connection between a user and the cutting tool. It is well known among those of skill in the art that the capacitance of the human body is approximately 300 picofarads. As a result, when a user contacts cutting tool 14, the capacitance of the user's body is electrically coupled to the inherent capacitance of the cutting tool, thereby creating an effective capacitance that is larger than the inherent capacitance of the cutting tool alone. Thus, detection system 32 may be electrically coupled to measure the capacitance of the cutting tool, so that any substantial change in the measured capacitance would indicate contact between the user's body and the cutting tool. The various prior art safety systems described above also provide various ways to detect contact or proximity that can be used to trigger the brake system.

Figure 3:
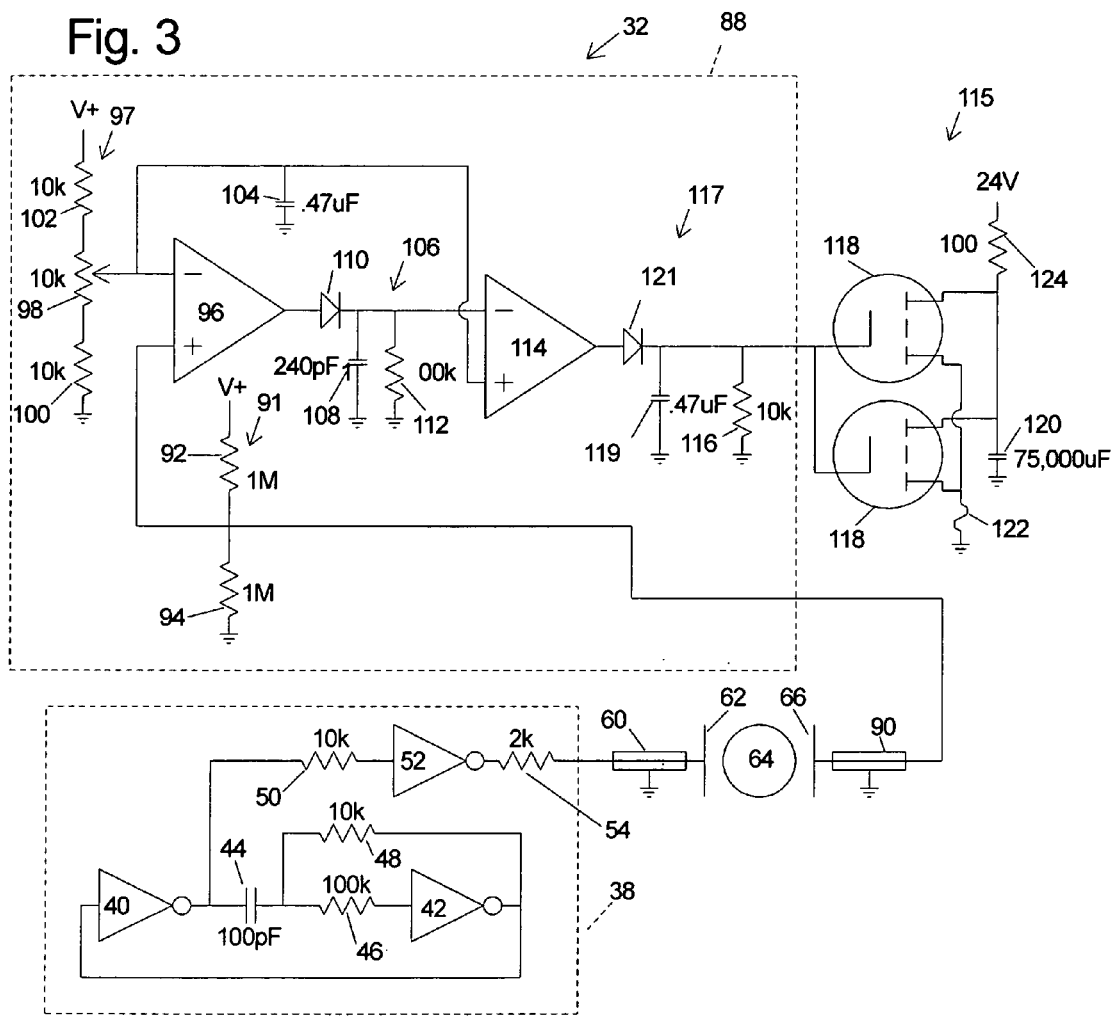
FIG. 3 is a schematic circuit diagram of an exemplary first electrical system, an exemplary second electrical system, and an exemplary firing system according to the present invention.
Figure 2:
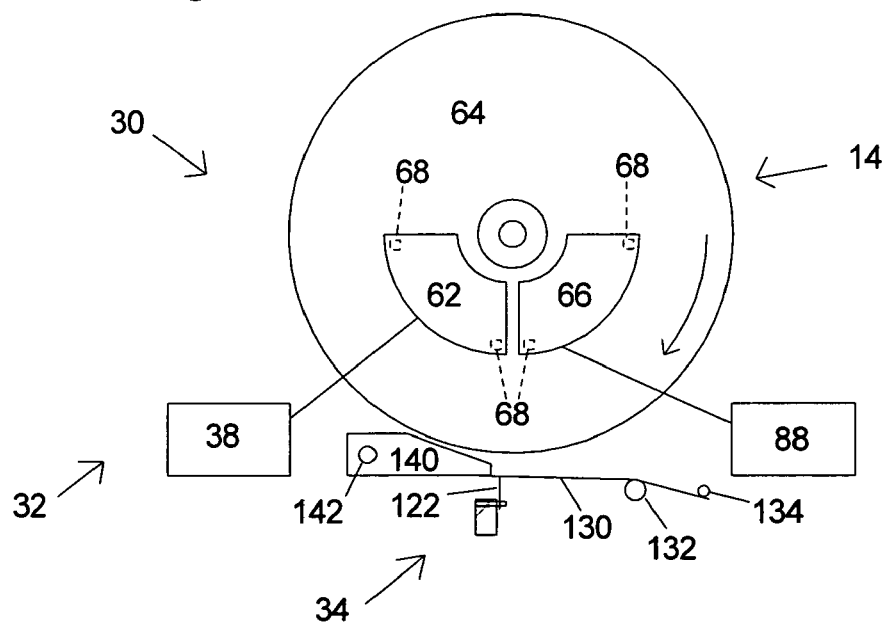
FIG. 2 is a schematic view of a contact detection system and a brake system of a fast-acting safety stop according to the present invention.

A specific example of a capacitive touch-sensing detection system 32 is schematically illustrated in FIGS. 2 and 3. Contact detection system 32 includes a first electrical system that is configured to generate an input signal and that is capacitively coupled, via the cutting tool, to a second electrical system configured to detect the input signal. In such an arrangement, any change in the capacitance of the cutting tool changes the input signal reaching the second electrical system. Thus, contact between a user's body and the cutting tool causes the second electrical system to detect a change in the input signal.

In the illustrated example, detection system 32 includes a first electrical system 38 configured to generate an input signal. First electrical system 38 is connected to a charge plate 62 that is mounted close to, but spaced-apart from, a cutting tool 14, which in FIG. 2 is shown in the form of a saw blade 64. Plate 62 is capacitively coupled to the saw blade by virtue of its size and placement parallel to and spaced-apart from the saw blade. A second charge plate 66 is also mounted close to the saw blade to establish a second capacitive coupling. It is within the scope of the present invention that the number, size and placement of charge plates may vary.

The effect of the arrangement shown in FIG. 2 is to form two capacitors in series through the blade, creating a capacitive shunt at the junction between the capacitors. Thus, the input signal is transmitted from charge plate 62 through the blade and onto charge plate 66. As illustrated, exemplary contact detection system 32 also includes a second electrical system 88 connected to charge plate 66, and configured to detect changes in the input signal received at charge plate 66.

When a user touches the saw blade, the capacitance of the user's body creates a capacitive load on the blade. As a result, the size of the capacitive shunt between the charge plates and the blade is increased, thereby reducing the charge that reaches plate 66. Thus, the magnitude of the input signal passed through the blade to plate 66 decreases when a user touches the blade. As will be discussed in more detail below, second electrical system 88 is configured to respond to this change in the input signal with an output signal to brake system 34.

In some cases, there may be a significant amount of resistance at the contact point of the user's dry skin and the blade. This resistance may reduce the capacitive coupling of the user's body to the blade. However, when the teeth on the blade penetrate the outer layer of the user's skin, the moisture inherent in the internal tissue of skin will tend to decrease the resistance of the skin/blade contact, thereby establishing a solid electrical connection. Moreover, as will be described below, the sensitivity of second electrical system 88 can be adjusted as desired to recognize even slight changes in the input signal.

While one exemplary system and method for detecting contact between the user's body and the blade is described herein, many other systems and methods are available and within the scope of the invention. For example, the detection system may sense the resistance of the human body upon contact between the user's body and the blade to detect contact. As another example, a radio signal may be broadcast near the blade so that the user's body acts as an antenna to change the signal received through the blade when contact is made between the user's body and the blade. Similarly, a signal could be applied to the user's body by virtue of standing on a signal transfer mat or wearing a transmitter and the detection system could monitor for reception of the signal upon contact with or proximity to the cutting tools.

As a further example, a proximity detector may be used as described above. Since brake system 34 is capable of stopping the blade within a few milliseconds, the proximity detector may be set to trigger only upon extremely close positioning of the user's body relative to the blade. This would allow the user to manipulate the work piece close to the blade without triggering the brake system. As another example, the wire-mesh glove detection system described above in connection with the meat cutting equipment may be used. Thus, it will be appreciated that while an exemplary embodiment has been described which uses a capacitive contact detection system, any suitable method of detecting contact or close proximity of the user's body to the blade may be used.

FIG. 3 illustrates one suitable configuration of first electrical system 38 and second electrical system 88. However, it will be appreciated by those of skill in the electrical arts that the exemplary configuration of detection system 32 illustrated in FIG. 3 is just one of many configurations which may be used. Thus, it will be understood that any suitable embodiment or configuration could be used within the scope of the invention.

As shown in FIG. 3, first electrical system 38 includes an oscillator circuit that generates a wave input signal, such as a square wave signal, at a frequency of approximately 200 khz and voltage amplitude of 12 volts. Alternatively, first electrical system 38 may be configured to generate a signal of a different frequency and/or a different amplitude and/or different waveform. The oscillator is formed by a pair of inverters 40, 42 from a CD4040 configured as a bistable oscillator. The output of inverter 40 is connected to a 100 pF capacitor 44, which is connected through a 100 kΩ resistor 46 to the input of inverter 42. A 10 kΩ resistor 48 is connected between the output of inverter 42 to the junction between capacitor 44 and resistor 48. The output of inverter 42 is connected to the input of inverter 40. A 10 kΩ resistor 50 connects the output of inverter 40 to the input of another inverter 52, which serves as an output buffer to drive the input wave signal onto the blade. A 2 kΩ series resistor 54 functions to reduce any ringing in the input signal by damping the high frequency components of the signal.

It will be appreciated that the particular form of the oscillator signal may vary and there are many suitable waveforms and frequencies that may be utilized. The waveform may be chosen to maximize the signal-to-noise ratio, for example, by selecting a frequency at which the human body has the lowest resistance or highest capacitance relative to the workpiece being cut. In addition, there are many different oscillator circuits that are well known in the art and which would also be suitable for generating the input signal.

The input signal generated by the oscillator is fed through a shielded cable 60 onto charge plate 62. Shielded cable 60 functions to insulate the input signal from any electrical noise present in the operating environment, insuring that a "clean" input signal is transmitted onto charge plate 62. Alternatively, other methods may be used to prevent noise in the input signal. As a further alternative, second electrical system 88 may include a filter to remove any noise in the input signal or other electrical noise detected by charge plate 66.

Generally speaking, the spacing of the charge plates from the blade is not critical. However, it may be desirable to separate the plates from the blade by a distance selected to reduce the effect of deflections in the blade on the capacitance between the blade and the plates. For instance, if the blade is displaced 1/32 of an inch toward one of the plates by loads created during cutting operations, the capacitance to that plate is increased. Since the capacitance is proportional to the area of the plate divided by the spacing, a relatively large spacing reduces the relative effect of a given blade displacement. Similarly, placing the plates relatively close to the center of the blade is preferable because the blade undergoes minimal lateral displacement nearer the arbor upon which it is mounted. Distances in the range of approximately 1/32 inch and approximately 1/2 inch have proven effective, although values outside this range could be used under appropriate circumstances.

In an alternative embodiment, at least one of the charge plates may include one or more insulating spacers 68 mounted on the side of the charge plate adjacent the blade, such as shown in FIG. 2. Spacers 68 act as physical barriers to prevent the blade from deflecting too close to the charge plate. This may be especially useful when the distances between the charge plates and the blade are relatively small. The spacers may be constructed of any suitable electrically insulating material, including ceramic, glass, etc. In the exemplary embodiment depicted in FIG. 2, spacers 68 cover only a small portion of the area between the charge plates and the blade. As a result, the spacers have relatively little effect on the capacitance between the blade and the plate. Alternatively, the spacers may cover a substantially larger portion, or even all of the space between the charge plates and the blade. In this latter case, the spacer will function, at least partially, as the dielectric between the conductive surfaces of the charge plates and the blade. Thus, the capacitance between the blade and the charge plates will vary depending on the dielectric constant of the spacer. In addition to one or more spacers 68 mounted between the charge plates and the blade, opposing spacers (not shown) may be mounted on the side of the blade opposite the charge plates to prevent the blade from deflecting too far from the charge plates. The spacers may be designed to slide on the surface of the blade so that the plates move with any deflections of the blade. An advantage of this arrangement is the close spacing that can be established and maintained, thereby reducing the size of the plates.

It will be appreciated that the size of charge plates 62 and 66 may also vary. Typical plate areas are between 1 and 10 square inches, although many different sizes may be used, including sizes outside of this typical range. An example of a suitable plate material is copper-plated printed circuit board, which is relatively rigid and thin. Other examples include any relatively electrically conductive material such as gold, aluminum, copper, steel, etc. Where there are large grounded metal structures near the blade, a larger driving charge plate 62 can be used to partially shield the blade from capacitive coupling to the grounded structure. Although the larger plate also will have increased capacitive coupling to the grounded structure, this does not interfere with the operation of the system since first electrical system 38 is capable of driving much larger capacitance loads than are created under these circumstances.

As described above, the input signal is coupled from charge plate 62 to charge plate 66 via blade 64. As shown in FIG. 3, the signal received on charge plate 66 is then fed via a shielded cable 90 to second electrical system 88. The second electrical system is configured to detect a change in the signal due to contact between the user's body and the blade. It will be appreciated that second electrical system 88 may be implemented in any of a wide variety of designs and configurations. In the exemplary embodiment depicted in FIG. 3, second electrical system 88 compares the amplitude of the input signal received at charge plate 66 to a determined reference voltage. In the event that the input signal received at charge plate 68 falls below the reference voltage for a determined time, the second electrical system produces an output signal to brake system 34. The brake system is configured to receive the output signal and immediately act to stop the blade.

The particular components of second electrical system 88 may vary depending on a variety of factors including the application, the desired sensitivity, availability of components, type of electrical power available, etc. In the exemplary embodiment, a shielded cable 90 is connected between charge plate 66 and a voltage divider 91. Voltage divider 91 is formed by two 1MΩ resistors 92, 94 connected in series between the supply voltage (typically about 12 volts) and ground. The voltage divider functions to bias the output signal from charge plate 66 to an average level of half of the supply voltage. The biased signal is fed to the positive input of an op-amp 96. Op-amp 96 may be any one of many suitable op-amps that are well known in the art. An example of such an op-amp is a TL082 op-amp. The negative input of the op-amp is fed by a reference voltage source 97. In the exemplary embodiment, the reference voltage source is formed by a 10 kΩ potentiometer 98 coupled in series between two 10 kΩ resistors 100, 102, which are connected to ground and the supply voltage, respectively. A 0.47 µF capacitor 104 stabilizes the output of the reference voltage.

As will be understood by those of skill in the art, op-amp 96 functions as a comparator of the input signal and the reference voltage. Typically, the voltage reference is adjusted so that its value is slightly less than the maximum input signal voltage from charge plate 66. As a result, the output of the op-amp is low when the signal voltage from the charge plate is less than the reference voltage and high when the signal voltage from the charge plate is greater than the reference voltage. Where the input signal is a periodic signal such as the square wave generated by first electrical system 38, the output of op-amp 96 will be a similar periodic signal. However, when a user contacts the blade, the maximum input signal voltage decreases below the reference voltage and the op-amp output no longer goes high.

The output of op-amp 96 is coupled to a charging circuit 106. Charging circuit 106 includes a 240 pF capacitor 108 that is connected between the output of op-amp 96 and ground. A 100 kΩ discharge resistor 112 is connected in parallel to capacitor 108. When the output of op-amp 96 is high, capacitor 108 is charged. Conversely, when the output of op-amp 96 is low, the charge from capacitor 108 discharges through resistor 112 with a time constant of approximately 24 µs. Thus, the voltage on capacitor 108 will discharge to less than half the supply voltage in approximately 25–50 µs unless the capacitor is recharged by pulses from the op-amp. A diode 110 prevents the capacitor from discharging into op-amp 96. Diode 110 may be any one of many suitable diodes which are well known in the art, such as a 1N914 diode. It will be appreciated that the time required for capacitor 108 to discharge may be adjusted by selecting a different value capacitor or a different value resistor 112.

As described above, charging circuit 106 will be recharged repeatedly and the voltage across capacitor 108 will remain high so long as the detected signal is received substantially unattenuated from its reference voltage at op-amp 96. The voltage from capacitor 108 is applied to the negative input of an op-amp 114. Op-amp 114 may be any one of many suitable op-amps which are well known in the art, such as a TL082 op-amp. The positive input of op-amp 114 is tied to a reference voltage, which is approximately equal to one-half of the supply voltage. In the exemplary embodiment depicted in FIG. 3, the reference voltage is provided by reference voltage source 97.

So long as charging circuit 106 is recharged, the output of op-amp 114 will be low. However, if the output of op-amp 96 does not go high for a period of 25–50 µs, the voltage across capacitor 108 will decay to less than the reference voltage, and op-amp 114 will output a high signal indicating contact between the user's body and the blade. As will be described in more detail below, the output signal from op-amp 114 is coupled to actuate brake system 34 and stop the blade. The time between contact and braking can be adjusted by selecting the time constant of capacitor 108 and resistor 112.

It should be noted that, depending on the size, configuration and number of teeth on the blade and the position of contact with the operator, the electrical contact between the operator and blade might be intermittent. As a result, it is desirable that the system detect contact in a period less than or equal to the time a single tooth would be in contact with a user's finger or other body portion. For example, assuming a 10-inch blade rotating at 3600 rpm and a contact distance of about one-quarter of an inch (the approximate width of a fingertip), a point on the surface of the blade, such as the point of a tooth, will be in contact with the user for approximately 100 µs. After this period of contact, there will normally be an interval of no contact until the next tooth reaches the finger. The length of the contact and non-contact periods will depend on such factors as the number of teeth on the blade and the speed of rotation of the blade.

It is preferable, though not necessary, to detect the contact with the first tooth because the interval to the second tooth may be substantial with blades that have relatively few teeth. Furthermore, any delay in detection increases the depth of cut that the operator will suffer. Thus, in the exemplary embodiment, the charging circuit is configured to decay within approximately 25–50 µs to ensure that second electrical system 88 responds to even momentary contact between the user's body and the blade. Further, the oscillator is configured to create a 200 khz signal with pulses approximately every 5 µs. As a result, several pulses of the input signal occur during each period of contact, thereby increasing the reliability of contact detection. Alternatively, the oscillator and charging circuit may be configured to cause the detection system to respond more quickly or more slowly. Generally, it is desirable to maximize the reliability of the contact detection, while minimizing the likelihood of erroneous detections.

Figure 4:
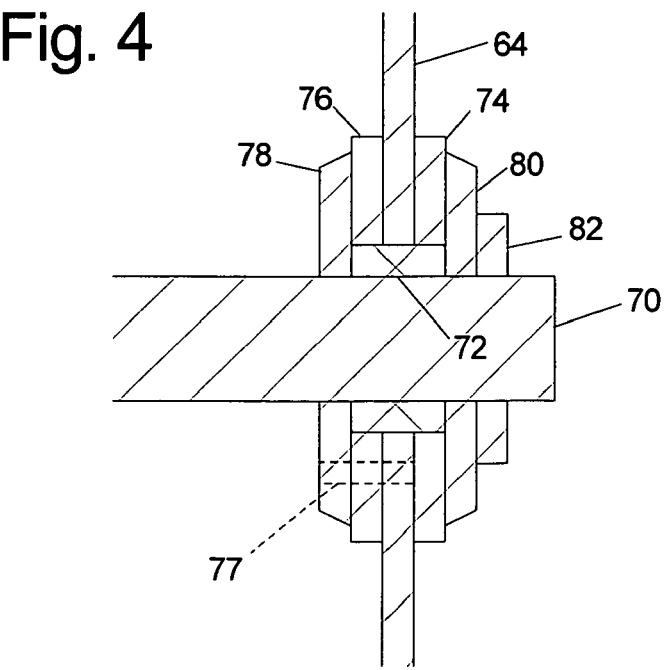
FIG. 4 is a sectional view of a saw blade mounted on an arbor according to the present invention.

It will be appreciated by those of skill in the art that blade 64 should be insulated from ground to allow the input signal to be capacitively coupled from charge plate 62 to charge plate 66. In the exemplary embodiment depicted in FIG. 4, blade 64 is electrically isolated from arbor 70 on which it rides, thus insulating the blade from ground and the remaining structure of the machine. There are a variety of suitable arrangements for providing electrical insulation between the blade and the arbor, which may vary depending on the particular configuration of machine 10. For example, in the case of a ⅝-inch arbor shaft 70, blade 64 can be formed with a one-inch diameter hole into which a 3/16-inch thick cylindrical plastic bushing 72 is fitted, such as shown in FIG. 4. Insulating washers 74, 76 are disposed on either side of the blade to isolate the blade from the arbor flange 78 and arbor washer 80. The insulating washers should be thick enough that only negligible capacitance is created between the blade and the grounded arbor flange and washer. A typical thickness is approximately ⅛-inch, although 1/32-inch or less may be suitable depending on other factors. In addition, it is possible to construct some or all of the arbor components from non-conductive materials, such as ceramic, to reduce or eliminate the need for electrical isolation from the arbor.

An arbor nut 82 holds the entire blade assembly on arbor 70. Friction established by tightening the arbor nut allows torque from the arbor to be transmitted to the saw blade. It is preferable, although not essential, that the blade be able to slip slightly on the arbor in the event of a sudden stop by the brake to reduce the mass that must be stopped and decrease the chance of damage to the blade, arbor, and/or other components in the drive system of the saw. Furthermore, it may be desirable to construct the bushing from a material that is soft enough to deform when the blade is stopped suddenly. For example, depending on the type of braking system used, a substantial radial impact load may be transmitted to the arbor when the brake is actuated. A deformable bushing can be used to absorb some of this impact and reduce the chance of damage to the arbor. In addition, proper positioning of the brake in combination with a deformable bushing may be employed to cause the blade to move away from the user upon activation of the brake, as will be discussed in further detail below.

In an alternative embodiment, the arbor and/or part of its supporting framework is electrically isolated from ground instead of isolating the blade from the arbor. One benefit of this embodiment is that if the blade is electrically connected to the arbor, then the arbor itself can be used to capacitively couple the input signal from charge plate 62 to charge plate 66. While the particular implementation of this alternative embodiment will vary with the configuration of the cutting tool, one exemplary implementation is depicted in FIG. 5. As shown, blade 64 is mounted directly onto arbor 70. As in FIG. 4, the blade is secured to the arbor by arbor flange 78, arbor washer 80 and arbor nut 82.

The arbor is supported for rotational movement by a pair of bearings 79 spaced along the elongate axis of the arbor. However, bearings 79 do not contact the arbor directly. Instead, electrically insulating sleeves 84 are disposed between the arbor and the bearings. Bearings 79 are mounted in a movable arbor block 81. The arbor block allows the blade to be raised and lowered, as well as to be inclined for angled cuts. A motor (not shown) drives the arbor through a belt 83 that loops over a pulley 86 on the end of the arbor opposite the blade. The belt typically is non-conducting and thus does not electrically couple the arbor to ground.

Sleeves 84 may be constructed of any suitable material that is relatively durable and non-conductive, including plastic, ceramic, etc. The sleeves may be configured to fit over a constant-diameter arbor as shown, or the arbor may be notched to receive the sleeves so that the outer diameter of the sleeves are flush with the outer diameter of the arbor. Furthermore, it will be appreciated that there are many other arrangements for electrically insulating the arbor. As just a few examples, sleeves 84 may be disposed between bearings 79 and arbor block 81, or at least portions of the bearings may be constructed of non-conductive materials. Alternatively, larger portions of the arbor assembly may be isolated from the rest of the saw.

In any event, charging plates 62 and 66 are disposed alongside, but slightly spaced from, the arbor. The charging plates typically are shaped and arranged relative to the arbor to ensure adequate capacitive coupling. For example, the charging plates may be trough-shaped to conform to the cylindrical shape of the arbor, as illustrated in FIG. 5. Alternatively, the plates may be ring-shaped to completely surround axially-spaced portions of the arbor. The charging plates typically are supported on arbor block 81, such as by mounts 85 extending from the frame. This arrangement ensures that the charging plates will move in tandem with the arbor when the position or angle of the blade is adjusted. The mounts usually will be configured to electrically insulate the charging plates from the frame. The charge plates can be positioned very close to the arbor because it does not deflect during use like the blade, thereby allowing smaller charge plates to the utilized.

While a few exemplary arrangements for capacitively coupling the charging plates to the arbor have been described, it will be understood that there are many suitable arrangements and that the invention is not limited to any particular one. For example, one or both of the charging plates may be positioned on the other side of the pulley (as illustrated in FIG. 5) where there is insufficient room between the bearings, or between the bearings and the belt. Also, a direct rather than capacitive electrical connection to the blade can be maintained to detect the capacitive load of the user upon contact.

Turning attention now to brake system 34, there are many possible methods of stopping blade 64 once detection system 32 signals a contact between the user's body and the blade. In one embodiment, brake system 34 includes one or more pawls configured to move into contact with the blade and bring the blade to an immediate stop. The pawls typically are positioned in relatively close proximity to the blade to reduce the amount of time required to move the pawl into contact with the blade. A driving mechanism is responsive to the output signal of detection system 32 to move the pawl into contact with the blade. The pawls may engage any one or more portions of the blade, including the teeth, the sides, etc. Alternatively, the pawls may engage the arbor provided the blade is rigidly attached to the arbor to prevent rotation of the blade during a sudden stop of the arbor. Some arbor assemblies include an arbor flange 78 having a pin 77 that extends parallel to arbor shaft 70 to engage a hole in the blade spaced from the center hole, such as shown in dashed lines in FIG. 4. If present, pin 77 may be a shear pin to allow the blade to be stopped virtually instantaneously without also stopping the arbor.

One exemplary embodiment of brake system 34 is illustrated schematically in FIG. 2. It will be appreciated that the arrangement of the various elements of the brake system will vary with the configuration of the particular cutting tool. As shown, a single brake pawl 140 is pivotally mounted to the saw frame over a shoulder bolt 142 that is screwed into, or otherwise secured to, the frame of the saw adjacent the blade. The pawl is mounted to engage the teeth at the periphery of the blade. The end of the pawl adjacent the blade may be beveled or otherwise shaped to ensure that the pawl engages the teeth completely and immediately upon contact. In addition, the shape of the pawl may be designed such that once contact with the teeth occurs, the motion of the blade pivots the pawl further and drives the pawl more tightly against the teeth.

In the exemplary embodiment, the driving mechanism includes a spring 130 adapted to press the free end of the pawl against the blade. Typically, the spring will be configured to exert continuous force on the pawl in the direction of the blade once the brake system is actuated. This will ensure that the pawl does not bounce backward from contact with the blade. It will be appreciated that many spring configurations may be used, including compression springs, tension springs, torsion springs, etc. In the exemplary embodiment, the spring is formed of a section of ⅛-inch piano wire with a coil 132 turned in the center and mounted over a bolt (not shown) to a portion of the saw frame. However, other sizes and types of wire would be suitable as well. The wire nose gear used in radio-controlled airplanes is another example of a suitable spring. In any event, the spring is biased adjacent the pawl to force the pawl against the blade. Typically, the spring will supply 1–500 pounds of force to the pawl, with values between 15–100 being more preferred. Greater forces provide faster actuation, but make the system to release the pawl more complicated.

In the depicted embodiment, one end of the spring is biased against another bolt 134 mounted to the saw frame. The end of spring 130 opposite bolt 134 contacts the free end of pawl 140. Coil 132 and bolt 134 are positioned to hold the spring in flexion against the pawl even when the pawl is in contact with the blade. A restraining member 122 holds the spring in slightly further flexion to allow the pawl to pivot slightly away from the blade during normal use. When detection system 32 produces an output signal indicating contact between the user's body and the blade, the restraining member releases the spring, which drives the pawl into engagement with the blade. In the event that brake system 34 is activated and the spring is released, the system can be reset by pulling the spring away from the pawl and reconnecting and/or replacing the restraining member.

Restraining member 122 can be configured in any of a variety of ways. Typically, the restraining member is configured to release the spring virtually instantaneously upon receipt of an output signal from the detection system. In the exemplary embodiment, restraining member 122 takes the form of a fusible member or wire. Fusible member 122 is connected to a firing system 115 (described below) that melts the wire in response to an output signal by the detection circuit. Once the wire melts, the spring is released to drive the pawl into the blade. To reset the exemplary brake system, a new fusible member is installed to hold the spring away from the blade. The pawl may also be replaced.

Fusible member 122 may be any of a variety of materials that are well known in the art. For example, one suitable fusible member is a 0.010-inch nichrome wire or a steel strand. Generally, the fusible member should have a high tensile strength so that the strength is maximized relative to the heat that is required to melt the member. In the exemplary embodiment, the wire is formed with a loop at each end. The overall length is generally less than about an inch, with a break region of about $\frac{1}{16}$- to $\frac{1}{2}$-inch between the loops. A short break region is beneficial to focus the power delivered to a small region when the brake is tripped. It may be desirable to form the fusible member from a larger wire with a reduced waist section of small diameter to achieve a higher current density at in the waist section for more focused heating.

One end loop of the fusible member is connected to the end of brake bias spring 130 that is opposite bolt 134. The other end of the loop is mounted to an electrically isolated contact stud 136. When current is applied to the contact stud, it flows through the fusible member to spring 130. The conductivity of the spring and bolt electrically connects the fuse to the saw frame, which is grounded. Thus, when current is supplied to contact stud 136, it flows through the fusible member to the grounded saw frame. When sufficient current is supplied, the fusible member will melt and release the spring to drive the pawl against the blade. It will be appreciated that the fusible member can be arranged in many alternative ways within the scope of the invention. As one example, one loop of the wire can be attached to contact stud 136 and the opposite loop attached to a grounded stud (not shown). If the middle of the wire is placed over the end of the spring adjacent the pawl, the spring will be released when the wire is melted. In this arrangement, the current to melt the fusible member travels only from the contact stud, through the fusible member and into the grounded stud.

It will be appreciated that the size of the fusible member will depend, at least partially on the force required to restrain the spring. In general, greater spring forces are desirable to increase the speed and force with which the pawl contacts the blade. Where more pressure is required, a larger diameter fusible member may be needed, thereby requiring a larger amount of current to melt the fusible member. In the exemplary embodiment depicted in FIG. 2, the spring typically applies between 5 and 15 pounds of force against the fusible member and subsequently against the brake pawl, when released. It should be understood that a wide range of forces and mechanisms can be used to shift the pawl, up to hundreds of pounds or more. Under some circumstances, it may also be desirable to use a two-stage release system, such as used in many traps, to reduce the force that the fusible member is required to exert. See FIG. 28, below. This may allow use of a smaller fusible wire that can be melted more quickly and or with a smaller current surge.

As mentioned above, fusible member 122 is melted by a firing system 115 (shown in FIG. 3) that produces a sudden current surge to the fusible member in response to an output signal from the contact detection system. For the exemplary fusible member described above, approximately 20–100 Amps are required to ensure complete and rapid melting. As will be appreciated by those of skill in the art, there are many circuits suitable for supplying this current surge. The exemplary embodiment of firing system 115 shown in FIG. 3 includes one or more charge storage devices that are discharged through fusible member 122 in response to an output signal from second electrical system 88. The use of charge storage devices obviates the need for a large current supply to melt the fusible member. It will be appreciated, however, that a current supply may be used instead of charge storage devices. Alternatively, other devices may be used to supply the necessary current, including a silicon-controlled rectifier or triac connected to supply line 22.

The firing system of the exemplary embodiment includes a pair of relatively high-current transistors 118 coupled to pass the current stored in the storage device to fusible member 122. Transistors 118 are switched on by the output signal from second electrical circuit 88. As illustrated in FIG. 3, the output of op-amp 114 is connected by a 10 k resistor 116 to ground and to the gates of transistors 118. Any suitable transistors may be used, such as IRFZ40 MOSFET transistors, which are well known in the art. The transistors are connected in parallel between charge storage devices 120 and fusible member 122. In the exemplary embodiment, charge storage devices 120 are in the form of a 75,000 µF capacitor bank. A 100-ohm resistor 124 connected to a 24-volt supply voltage establishes and maintains the charge on the capacitor bank. When the output of op-amp 114 goes high, transistors 118 allow the charge stored in the capacitor bank to pass through the fusible member. The sudden release of the charge stored in the capacitor bank heats the fusible member to its melting point in approximately 1–5 ms. Alternatively, one or more of the transistors may be replaced by other switching devices such as SCR's. One advantage of using stored charge to fuse the fusible member is that the firing system does not rely on the capacity of line power or the phase of the line voltage.

As described above, the contact between a user's body and the teeth of blade 64 might be intermittent depending on the size and arrangement of the teeth. Although second electrical system 88 typically is configured to detect contact periods as short as 25–50 µs, once the first tooth of the blade passes by the user's body, the contact signal received by the second electrical circuit may return to normal until the next tooth contacts the user's body. As a result, while the output signal at op-amp 114 will go high as a result of the first contact, the output signal may return low once the first contact ends. If the output signal does not remain high long enough to fully discharge the charge storage devices, the fusible member may not melt. Therefore, second electrical system 88 may include a charging circuit 117 on the output of op-amp 114, similar to charging circuit 106. Once op-amp 114 produces a high output signal, charging circuit 117 functions to ensure that the output signal remains high long enough to sufficiently discharge the charge storage devices to melt the fusible member. In the exemplary embodiment, charging circuit 117 includes a 0.47 µF capacitor 119 connected between the output of op-amp 114 and ground. When the output of op-amp 114 goes high, capacitor 119 charges to the output signal level. If the output of op-amp 114 returns low, the voltage across capacitor 119 discharges through 10 k resistor 116 with a time constant of approximately 4.7 ms.

A diode, such as an 1N914 diode, prevents capacitor 119 from discharging through op-amp 114.

The above-described system is capable of detecting contact within approximately 50 μs and releasing the brake in approximately one to approximately three milliseconds. The brake then contacts the blade in approximately one to approximately three milliseconds. The blade will normally come to rest within not more than 2–10 ms of brake engagement. As a result, injury to the operator is minimized in the event of accidental contact with the cutting tool. With appropriate selection of components, it may be possible to stop the blade may within 1 ms, or less. Alternatively, the brake system may be configured to stop the blade in 5, 10, 15, 20 or 50 milliseconds depending on various parameters such as spring force, pawl size and shape, blade type, blade speed, etc.

While exemplary embodiments of first electrical system 38, second electrical system 88, and firing system 115 have been described above with specific components having specific values and arranged in a specific configuration, it will be appreciated that these systems may be constructed with many different configurations, components, and values as necessary or desired for a particular application. The above configurations, components, and values are presented only to describe one particular embodiment that has proven effective, and should be viewed as illustrating, rather than limiting, the invention.

Figure 6:
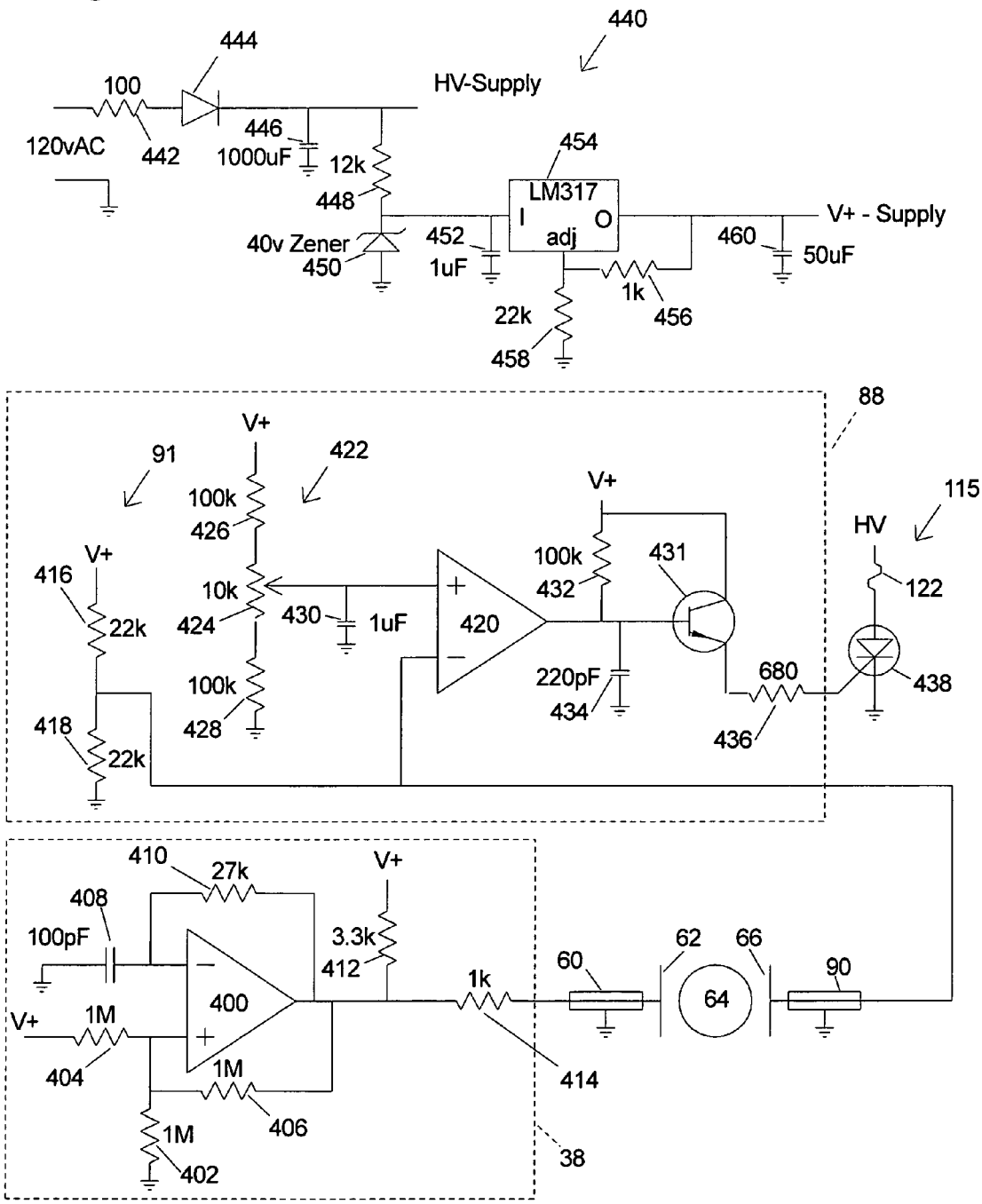
FIG. 6 is a schematic circuit diagram of an alternative first electrical system, an alternative second electrical system, and an alternative firing system according to the present invention.

FIG. 6 shows alternative embodiments of first electrical system 38, second electrical system 88, and firing system 115 which may form part of safety stop 30. Alternative first electrical system 38 is configured to generate a square wave signal using only a single comparator 400 such as an LM393 comparator. A 1M resistor 402 is connected between the high input terminal of comparator 400 and ground. Another 1M resistor 404 is connected between the high input terminal of comparator 400 and a low voltage supply V. A 1M resistor 406 is connected between the high input terminal of the comparator and the output of the comparator. A 100 pF capacitor 408 is connected between the low input terminal of the comparator and ground. A 27 k resistor 410 is connected between the low input terminal of the comparator and the output of the comparator. A 3.3 k resistor 412 is connected between the low voltage supply V and the output of the comparator. The alternative oscillator circuit illustrated in FIG. 6 produces a square wave having a frequency of approximately 500 khz. A 1k resistor 414 is connected between the output of the comparator and shielded cable 60 to reduce ringing. It will be appreciated that the values of one or more elements of alternative first electrical system 38 may be varied to produce a signal having a different frequency, waveform, etc.

As in the exemplary embodiment described above, the signal generated by alternative first electrical system 38 is fed through shielded cable 60 to charge plate 62. The signal is capacitively coupled to charge plate 66 via blade 64. Alternative second electrical system 88 receives the signal from charge plate 66 via shielded cable 90 and compares the signal to a reference voltage. If the signal falls below the reference voltage for approximately 25 μs, an output signal is generated indicating contact between the blade and the user's body.

Alternative second electrical system 88 includes a voltage divider 91, which is formed of 22 k resistors 416 and 418. The voltage divider biases the signal received via cable 90 to half the low voltage supply V. The lower resistance of resistors 416, 418 relative to resistors 92, 94 serves to reduce 60 hz noise because low-frequency signals are attenuated.

The biased signal is fed to the low input terminal of a second comparator 420, such as an LM393 comparator. The positive terminal of comparator 420 is connected to reference voltage source 422. In the depicted embodiment, the reference voltage source is formed by a 10 kΩ potentiometer 424 coupled in series between two 100 Ωk resistors 426, 428 connected to the low voltage supply V and ground, respectively. A 0.1 μF capacitor 430 stabilizes the output of the reference voltage. As before, the reference voltage is used to adjust the trigger point.

The output of second comparator 420 is connected to the base terminal of an npn bipolar junction transistor 431, such as a 2N3904 transistor. The base terminal of transistor 431 is also connected to low voltage supply V through a 100 k resistor 432, and to ground through a 220 pF capacitor 434. Potentiometer 432 is adjusted so that the voltage at the positive terminal of comparator 420 is slightly lower than the high peak of the signal received at the negative terminal of the second comparator when there is no contact between the blade and the user's body. Thus, each high cycle of the signal causes the second comparator output to go low, discharging capacitor 434. So long as there is no contact between the blade and the user's body, the output of the second comparator continues to go low, preventing capacitor 434 from charging up through resistor 432 and switching transistor 431 on. However, when the user's body contacts the blade, the signal received at the negative terminal of the second comparator remains below the reference voltage at the positive terminal and the output of the second comparator remains high. As a result, capacitor 434 is able to charge up through resistor 432 and switch transistor 431 on.

The collector terminal of transistor 431 is connected to low voltage supply V, while the emitter terminal is connected to 680 Ω resistor 436. When transistor 431 is switched on, it supplies an output signal through resistor 436 of approximately 40 mA, which is fed to alternative firing system 115. The alternative firing circuit includes fusible member 122 connected between a high voltage supply HV and an SCR 438, such as an NTE 5552 SCR. The gate terminal of the SCR is connected to resistor 436. Thus, when transistor 431 is switched on, the approximately 40 mA current through resistor 436 turns on SCR 438, allowing the high voltage supply HV to discharge to ground through fusible member 122. Once the SCR is switched on, it will continue to conduct as long as the current through fusible member 122 remains above the holding current of approximately 40 mA, even if the current to the gate terminal is removed. Thus, the SCR will conduct current through the fusible member until the fusible member is melted or the high voltage source is removed.

FIG. 6 also illustrates an exemplary electrical supply system 440 configured to provide both low voltage supply V and high voltage supply HV from standard 120VAC line voltage. Electrical supply system 440 is connected to provide low voltage supply V and high voltage supply HV to alternative first electrical system 38, alternative second electrical system 88, and alternative firing system 115. The line voltage is connected through a 100 Ω resistor 442 and a diode 444, such as a 1N4002 diode, to a 1000 μF charge storage capacitor 446. The diode passes only the positive portion of the line voltage, thereby charging capacitor 446 to approximately 160V relative to ground. The positive terminal of capacitor 446 serves as the high voltage supply HV connected to fusible link 122. When SCR 438 is switched on upon detection of contact between the blade and the user's body, the charge stored in capacitor 446 is discharged through the fusible link until it melts. It will be appreciated that the size of capacitor 446 may be varied as required to supply the necessary current to melt fusible member 122. It should be noted that the use of a HV capacitor leads to a much higher current surge, and therefore a faster melting of the fusible member than is the case with a low voltage system.

The positive terminal of capacitor 446 also provides a transformer-less source of voltage for low voltage supply V, which includes a 12 k resistor 448 connected between the positive terminal of capacitor 446 and a reverse 40V Zener diode 450. Diode 450 functions to maintain a relatively constant 40V potential at the junction between the diode and resistor 448. It can be seen that the current through the 12 k resistor will be about 10 mA. Most of this current is used by the low voltage circuit, which has a relatively constant current demand of about 8 mA. Note that while resistor 448 and diode 450 discharge some current from capacitor 446, the line voltage supply continuously recharges the capacitor to maintain the HV supply. A 0.1 µF capacitor 452 is connected in parallel with diode 450 to buffer the 40V potential of the diode, which is then connected to the input terminal of an adjustable voltage regulator 454, such as an LM317 voltage regulator. The ratio of a 1$k$ resistor 456 connected between the output terminal and adjustment terminal, and a 22 k resistor 458 connected between the adjustment terminal and ground, set the output voltage of regulator 454 to approximately 30 VDC. A 50 µF capacitor 460 is connected to the output terminal of regulator 454 to buffer sufficient charge to ensure that low voltage supply V can provide the brief 40 mA pulse necessary to switch on SCR 438. The described low voltage source is advantageous because of its low cost and low complexity.

It should be noted that when high voltage supply HV is discharged through fusible member 122, the input voltage to voltage regulator 454 may temporarily drop below 30V, thereby causing a corresponding drop in the low voltage supply V. However, since the brake system has already been triggered, it is no longer necessary for the detection system to continue to function as described and any drop in low voltage supply V will not impair the functioning of safety stop 30.

It will be appreciated by those of skill in the electrical arts that the alternative embodiments of first electrical system 38, second electrical system 88, firing system 115, and electrical supply system 440 may be implemented on a single substrate and/or in a single package. Additionally, the particular values for the various electrical circuit elements described above may be varied depending on the application.

FIG. 7 shows an alternative arrangement of brake system 34 configured to focus the current supplied by firing system 115 to a very small area of fusible member 122. Alternative brake system 115 includes a pawl 140 positioned to engage blade 64 under the urging of brake spring 130, which is compressed between the pawl and a spring block 470. The pawl is held slightly spaced from the blade against the urging of brake spring 130 by fusible member 122. The fusible member is attached to the pawl, such as by looping it around a hook 472 formed on the pawl. Alternatively, the fusible member may be attached to the pawl by a screw or other known mechanisms.

The fusible member also loops around a high voltage contact stud 474 and a discharge contact stud 476. The high voltage contact stud is connected to high voltage supply HV of electrical supply 440, while the discharge contact stud is connected to SCR 438 of alternative firing system 115. When SCR 438 is switched on, the charge supplied by the high voltage supply HV is discharged primarily through a portion 478 of fusible member 122 between studs 474 and 476. This serves to focus the discharge current to a relatively small portion of the fusible member, ensuring complete and rapid melting of the fusible member with less stored charge. In general, it is desirable to make section 478 as short as possible to minimize the length of fuse that needs to be heated. As shown in FIGS. 7–8, high voltage stud 474 and discharge stud 476 may be configured as opposite sides of a single structure with an insulating layer 479 disposed therebetween. Typical spacing between the studs would be approximately 1/64-inch to 1/8-inch. Once the fusible member has melted, the brake spring presses the pawl into engagement with the blade as described above. While the alternative arrangement of brake system 34 has been described in combination with alternative firing system 115, it will be appreciated that alternative brake system 34 may also be used in combination with the embodiment of firing system 115 depicted in FIG. 3. In such case, high voltage contact stud 474 would be connected to the emitters of transistors 118, while discharge contact stud 476 would be connected to ground.

Since contact detection system 32 and brake system 34 are configured to stop cutting tool 14 upon contact with a user's body, it may also be desirable to stop motor assembly 12 to prevent damage to the motor as it tries to drive the stopped cutting tool. However, since machine 10 typically is designed with the expectation that the cutting tool may stop due to binding, etc., it will usually be sufficient to turn off the motor assembly within a few seconds. This can be accomplished simply by cutting power to the motor. Thus, in one alternative embodiment, the brake activation signal from second electrical system 88 is also used to activate a normally closed switch relay (not shown) in the coil circuit of contactor 16. Similar to pressing stop switch 20, when the normally closed switch relay is activated, power is disengaged from the contactor coil and thereby the motor. It will be appreciated that there are many other suitable ways of stopping motor assembly 12 which are within the scope of the invention. As one example, power to the motor assembly may be controlled directly by safety stop 30 (e.g., through solid state on/off switches, etc.). Also, it is possible to simply allow existing overload circuitry to trip in to turn off the stalled motor.

Since the detection circuitry described above relies on certain electrical properties of the human body, the use of safety stop 30 while cutting some materials, such as foil-coated insulation, may cause the detection circuitry to falsely register contact with a user. Therefore, it may be desirable to provide a disablement control that prevents the brake from operating for a particular cutting operation. A suitable disablement control may include a mechanical switch between fusible member 122 and firing system 115. Alternatively, the switch may be a single-use switch configured to reset itself after each use. As a further alternative, safety stop 30 may include sensors adjacent the workpiece to detect the presence of foil, etc., and disable the brake system. This latter alternative relieves the user of having to remember to disable and re-enable the brake system.

As an alternative to disabling safety stop 30, the contact detection system may be configured to distinguish between metal and a user's body. For example, when a user's body comes into contact with the blade, the input signal received by second electrical system 88 is attenuated but not grounded. However, if a metal work piece (which was in contact with the grounded machine frame) contacted the blade, the input signal coupled onto the blade would be discharged to ground so that second electrical system 88 would receive no signal at all. Thus, second electrical system 88 may be configured to output an activation signal to firing system 155 only if an attenuated signal is received that has a peak below the previously described threshold and above a second threshold.

It should be understood that in a commercial embodiment of the present invention, much of the electronic functionality can be incorporated in a custom application specific integrated circuit (ASIC). In addition, at least a portion or all of the electronics may be powered by battery rather than by the power supply to the machine. However, the charge necessary to melt fusible member 122 will perferably be supplied by the line current to conserve the battery and because of the higher voltage available.

It also may be desirable to provide a logic control system configured to conduct various self-test safety checks, etc., when the machine is switched on or off and during use, to ensure that the safety stop is operating properly and to prevent inadvertent triggering of the brake system. Such a logic control system may be implemented in any of a variety of ways using any desired test sequence. A flowchart illustrating an exemplary logic sequence is shown in FIG. 9. The exemplary sequence begins when the user initially supplies power to the system, indicated at 600. The logic system first checks to determine whether the spacing between the blade and charge plates is correct, as indicated at 602. The blade-to-charge plate spacing may be measured by any suitable mechanism such as described in more detail below. If the spacing is outside acceptable limits, the system responds with an error signal, indicated at 604. The error signal may be an audible and/or visible signal, etc. Preferably, the logic system remains in the error state and prevents further operation of the machine until the correct blade-to-charge plate spacing is detected.

If the blade-to-charge plate spacing is acceptable, the logic system determines whether the proper (i.e., unattenuated) input signal from the first electrical system is being detected by the second electrical system, as indicated at 606. This step ensures that the brake will not be triggered accidentally upon start-up due to a fault in the first and/or second electrical systems, a grounded blade, incorrectly placed charge plates, etc. If the proper input signal is not detected, the system responds with an error signal 604, which can take the form of a beeper or flashing light or similar indicator. It will be appreciated that either the same or a different error signal may be produced for each fault condition.

If the proper input signal is detected, the system proceeds to determine whether a fusible member is present, as indicated at step 608. The presence of a fusible member may be determined by any suitable means including measuring the conductivity between contact stud 474 and discharge stud 476. If no fusible member is present, the system returns an error signal 604.

The system then checks the charge stored in the charge storage device, as indicated at 612. This step ensures that sufficient charge is present to melt the fusible member if contact is detected. If sufficient charge is not detected, the logic system responds with an error signal if sufficient charge is not detected within a determined time period.

In the exemplary sequence, after the predetermined checks are completed, the logic system allows power to be sent to motor assembly 12, as indicated at 614. It will be appreciated that the electrical sequence described above typically is completed within less than a second if no faults are detected. Alternatively, additional steps may be taken before the motor assembly is powered.

In addition to an initial power-up sequence, a logic system may be configured to perform any of a variety of checks during operation. For example, the rotation of the blade may be monitored by known mechanisms and the firing system may be disabled when the blade is not moving. This would allow the user to touch the blade when it is stopped to prevent engaging the pawl. Some embodiments may be configured to ensure the safety stop will continue to function even after power to the machine is turned off if the blade continues to rotate. As another example, power to the motor assembly may be shut off if an error occurs other than contact detection such as incorrect blade-to-charge plate spacing, insufficient charge on the charge storage devices, etc. It will be appreciated that a logic control system may be implemented to provide any of a variety of safety and/or operational functions desired.

In addition to the spring and fusible member systems described above, other systems can also be used to shift the pawl or pawls into contact with the blade. For example, as shown in FIG. 10, a relatively small explosive charge 150, in the form of a squib or detonator, can be used to drive the pawl against the blade. An example of a suitable explosive charge is an M-100 detonator available, for example, from Stresau Laboratory, Inc., of Spooner, Wis.

An exemplary embodiment of an explosive charge actuated system is depicted in FIG. 10. Although any suitable explosive charge system may be used, the exemplary embodiment preferably uses a self-contained charge or squib 150 to increase safety and focus the force of the explosion along the direction of movement of the pawl. A trigger line 164 extends from the charge to cause detonation.

Explosive charge 150 can be used to move pawl 140 by inserting the charge between the pawl and a stationary block 166 adjacent the charge. When the charge detonates, the pawl is pushed away from the block. A compression spring 130 is placed between the block and pawl to ensure the pawl does not bounce back from the blade when the charge is detonated. Prior to detonation, the pawl is held away from the blade friction-fit of the charge in both the block and pawl. However, the force created upon detonation of the charge is more than sufficient to overcome this friction fit. Alternatively, the pawl may be held away from the blade by other mechanisms such as a frangible member, gravity, a spring between the pawl and block (not shown), etc. It will be appreciated that the position of the charge relative to pivot bolt 142 will determine the distance that the opposite end of the pawl travels. The closer the charge is positioned to bolt 142, the further the opposite end of the pawl will travel. However, the amount of force needed to move the pawl will increase as the charge is moved closer to bolt 142 due to the smaller moment arm. Thus, the pawl may move more slowly for a particular amount of explosive force.

Furthermore, it will be appreciated that there are many other ways to drive the pawl into contact with the cutting tool in addition to the spring and explosive charge embodiments described above. For example, a DC solenoid can be over-driven with a current surge to create a rapid displacement. Alternatively, a pressurized air or gas cylinder can be used to supply the pressure in place of the brake spring or charge. As another alternative, the pawl may be supported on an electromagnet activated by the firing system to either repel the pawl against the blade, or release a spring-loaded pawl toward the blade.

Focusing now more closely on the pawl, it will be understood that the pawl may be constructed from one or more of a variety of materials. Examples of suitable materials include plastics, such as polycarbonate, rubber and wood, or even soft metals, such as lead or aluminum. It is generally desirable, though not required, that the pawl be sufficiently strong that the blade does not simply cut through it, but also soft enough to absorb some of the impact of the blade coming to a sudden stop. After the brake has been triggered, it is normally necessary to replace the fuse and perhaps the pawl. Depending on the speed with which the blade is stopped, the blade may also be damaged, or at least require removal of any portions of the pawl engaged thereto. Indeed, in an alternative embodiment of the brake system, the pawl is constructed of a sufficiently strong and hard material to break the teeth off of the blade rather than stopping the blade.

Figure 11:
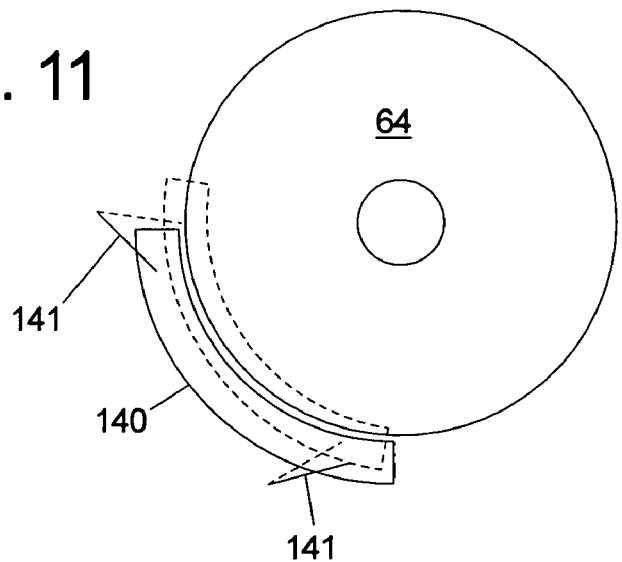
FIG. 11 is a schematic view of an alternative pawl configuration according to the present invention.
Figure 12:
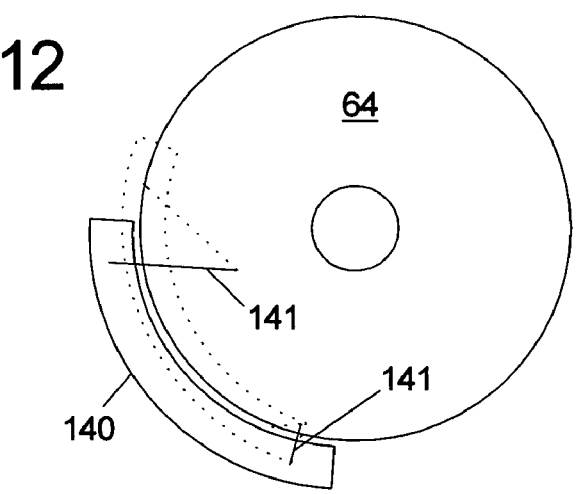
FIG. 12 is a schematic view of an alternative pawl configuration according to the present invention.
Figure 13:
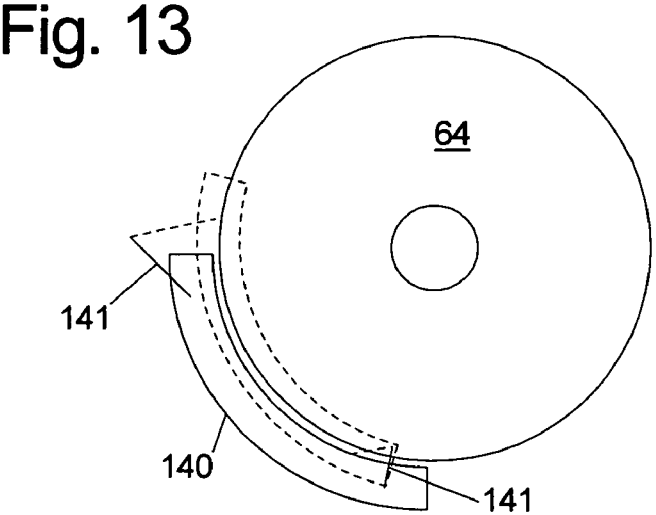
FIG. 13 is a schematic view of an alternative pawl configuration according to the present invention.

Pawl 140 may also be configured to have an elongate contact surface that engages a large portion of the blade. Examples of this alternative configuration are illustrated schematically in FIGS. 11–13. As can be seen, pawl 140 is mounted on a pair of pivot arms 141. The pivot arms can have the same or different lengths, and can be mounted to pivot anchors (not shown) positioned outside or inside the perimeter of the blade. One advantage of a pawl with an elongate contact surface is that the force exerted by the pawl is distributed across a larger portion of the blade, thereby allowing the blade to be stopped more quickly. The longer contact surface can also be used to reduce the chance of damage to the blade because the braking force is spread over more teeth.

Figure 14:
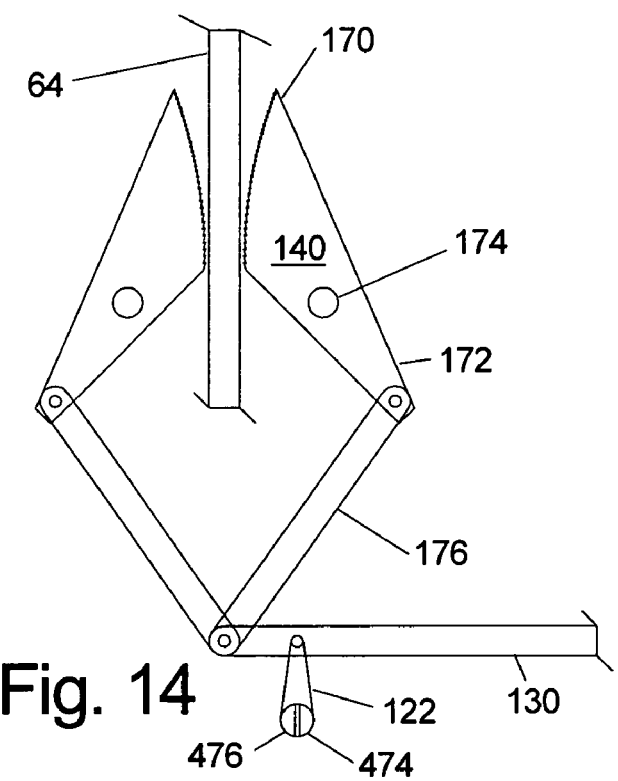
FIG. 14 is a schematic view of an alternative pawl configuration according to the present invention.

Although the exemplary embodiments are described above in the context of a single brake pawl that engages the teeth of a blade, the brake system may incorporate two pawls that engage two or more locations on the perimeter of the blade to decrease the stopping time or spread the stopping forces. It is also possible to utilize pawls that contact opposed points on the sides of the blade. FIG. 14 illustrates an exemplary embodiment using two pawls to contact opposite sides of the blade. As shown, pawls 140 are pivotally mounted on either side of blade 64. Each pawl includes a contact head 170 adjacent the blade, and a lever arm 172 opposite the contact head. The pawls are pivotally mounted on pins 174 that pass through pivot holes in the pawl between the contact head and the lever arm. Thus, when the lever arms of each pawl are pivoted upward (as shown in FIG. 14), the contact heads close together. The pawls are mounted relative to the blade so that the contact heads pivot toward the blade in the direction of blade travel. Once the pawls contact and grip the blade, they continue to pivot inward pulled by the downward motion (as shown in FIG. 14) of the blade. As a result, the blade is pinched more and more tightly between the contact surfaces of the pawls until the pawls can close no further, at which point the blade is stopped between the pawls.

To ensure that both pawls close together on the blade, a linkage 176 is provided which is attached, at either end, to lever arms 172. The central portion of linkage 176 extends beyond the blade to rest on the end of brake spring 130. As discussed above, the brake spring is held in flexion by fusible member 122, connected to contact stud 136. The spacing of the pawl contact heads from the blade is controlled by adjusting the position of the spring. When the fusible member is melted, the spring drives the linkage upward. If one pawl contacts the blade first, the upward motion of the linkage is transferred to the other pawl until it makes contact with the blade as well.

It will be appreciated that the dual-pawl system described above may be implemented with many variations within the scope of the invention. For example, the linkage may be driven upward by any of the other actuating means described above, including an explosive charge, solenoid, compressed gas, etc. As another example, one or more pawls may be positioned to contact only one side of the blade. Additionally, the linkage may be omitted, and each pawl actuated by a separate spring, explosive charge, solenoid, etc.

To increase the gripping action of the pawls on the blade, the contact surface of the pawls may be coated with a relatively high-friction material such as rubber. Alternatively, the pawls may be constructed of a harder material than the blade and have a ridged surface to "bite" into the blade, as illustrated. Alternatively, or additionally, the blade may be configured with grip structure such as coatings of high-friction material, grooves, notches, holes, protuberances, etc., to further increase the gripping action of the pawls.

As mentioned above, it will usually be desirable to locate the pawl relatively close to the blade to reduce the amount of time necessary to move the pawl into contact with the blade. While the optimum pawl-blade spacing may vary depending on the configuration of the particular cutting tool, the detection system, and/or the brake system, it has been found that a space of approximately $\frac{1}{32}$-inch to $\frac{1}{4}$-inch between the pawl and blade provides suitable results in the spring-actuated embodiment described above. However, as is well known in the art, many cutting tools such as saw blades do not have precisely uniform dimensions. For example, for circular saw blades having a nominal diameters of 10-inches and nominal thicknesses of 0.125-inch, actual blades from various manufacturers or for different applications may have diameters that range between 9.5-inches and 10.5-inches and thicknesses that range between 0.075-inch and 0.15-inch Therefore, to ensure uniform braking speed, it may be necessary to adjust the position of the pawl whenever a blade is replaced.

Figure 15:
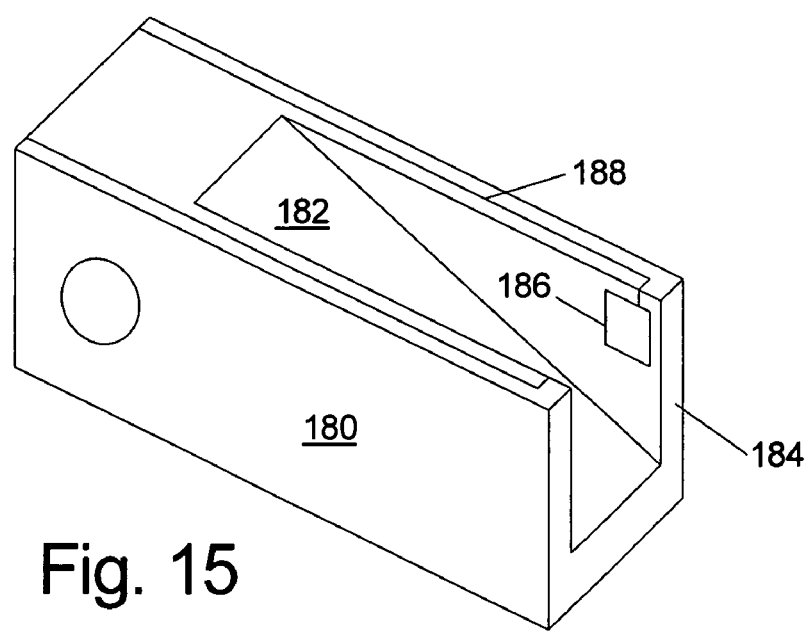
FIG. 15 is a detail view of an exemplary pawl configuration to automatically detect correct blade-to-pawl spacing according to the present invention.

Optionally, brake system 34 may include automatic and/or self-adjusting mechanism for ensuring that the spacing between the pawl and the cutting tool is within an acceptable range. It will be appreciated that there are a variety of mechanisms for automatically determining the pawl spacing, including electrical, mechanical, optical, etc. As one example, FIG. 15 illustrates a pawl 180 having a capacitive system for detecting correct pawl spacing. Similar to pawl 140 shown in FIG. 2, pawl 180 may include a portion 182 that is beveled or otherwise shaped to quickly and completely engage the teeth of a cutting tool. In addition, pawl 180 includes a pair of generally parallel, spaced-apart arms 184 which extend beyond portion 182. Arms 184 are disposed to extend on either side of the blade, without touching the blade, when the pawl is in place adjacent the blade. Each arm includes a capacitor plate 186 disposed on the inside surface of the arm adjacent the blade. Conductive leads 188 run from each capacitor plate 186 to suitable blade detector circuitry (not shown).

Capacitor plates 186 are positioned on arms 184 such that, when the pawl spacing is within a desired range, the blade extends between the two capacitor plates. It will be appreciated that the capacitance across plates 186 will vary depending on whether the blade is positioned between the plates. The blade detector circuitry is configured to drive an electrical signal through conductive leads 188 and detect changes in the capacitance across the plates. Suitable circuitry that may be used with pawl 180 is well known to those of skill in the art, and may include systems similar to first and second electrical systems 38 and 88 described above. The capacitor plates can optionally be shaped to detect when the pawl is too close to the blade as well as not close enough. Alternatively, two pairs of capacitor plates may be positioned on the pawl: one pair to detect if the pawl is too close to the blade, and the other pair to detect if the pawl is too far from the blade. In any event, the detector circuitry is configured to produce an error signal and/or disable the machine if the correct pawl spacing is not detected.

While one exemplary automatic pawl spacing detection system has been described above, it will be appreciated that there are many possible variations within the scope of the invention. For example, both capacitor plates may be positioned on the same side of the blade rather than on opposite sides. The capacitor plates and/or blade detection circuitry may be separate from the pawl. In the latter case, for example, the capacitor plates and detection circuitry may be mounted on a separate electronics board associated with the pawl. Alternatively, the capacitor plates may be replaced with one or more light-emitting diodes and detectors such that, when the pawl is properly positioned, the blade obstructs the optical path between the diodes and detectors. Other methods of detecting the proximity of the blade to the pawl are also possible. As a further option, capacitors 186, 188 may function as charge plates 62, 66 instead of, or in addition to, pawl-spacing detectors. In addition, a detection plate may be mounted on face 182 of the pawl. This plate can be used to detect the drive input signal use for contact detection. The amplitude of the signal detected at the plate will be inversely proportional to the space between the plate and the teeth of the blade. If this signal does not have an amplitude over a given threshold, the system would interpret this as indicating that the pawl face is not close enough to the blade.

Since the height and/or angle of the blade for many cutting machines are adjustable, it may be desirable to mount the pawl to a portion of the machine frame that moves with the blade. This arrangement will ensure that the pawl is maintained in a predetermined position relative to the blade. Similarly, the charging plates are preferably mounted to move with either the blade or arbor to maintain a predetermined and constant spacing thereto. One exemplary embodiment where the charging plates are mounted to move with the arbor has been described above.

Figure 16:
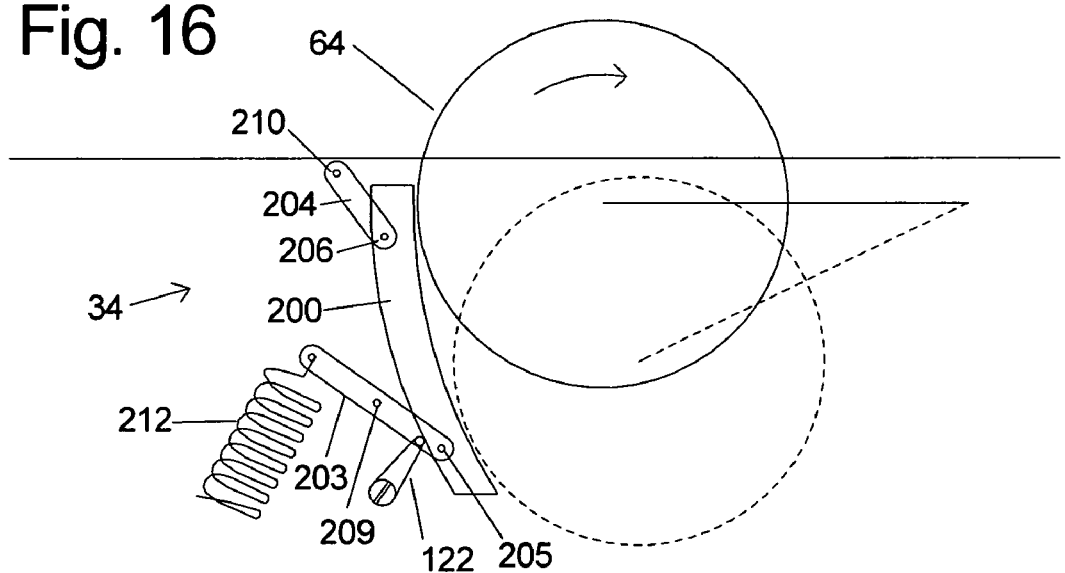
FIG. 16 is a side elevation of an alternative pawl configuration according to the present invention.
Figure 17:
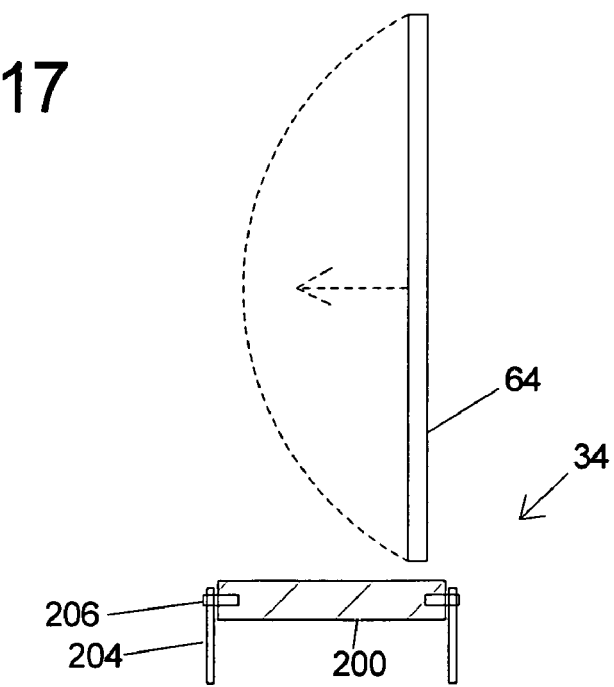
FIG. 17 is a top plan of the alternative pawl configuration of FIG. 16.

Alternatively, a stationary pawl may be configured to engage the blade in any orientation. One exemplary implementation of such a stationary pawl is depicted in FIGS. 16 and 17. In this exemplary embodiment, brake system 34 includes an elongate pawl 200. The pawl is sized and shaped to extend along the outer perimeter of blade 64 as it is adjusted vertically. Similarly the width of pawl 200 is sized to extend the breadth of the incline of blade 64. As shown in FIGS. 16 and 17, pawl 200 is mounted generally parallel with the vertical of travel of the blade, and generally normal to the axis of incline of the blade. As a result, the spacing between the blade and contact surface 202 remains constant regardless of the position or orientation of the blade.

The upper end of pawl 200 is pivotally attached to upper pivot arms 204 by pivot pins 206 that pass through one end of arms 204 into the sides of the pawl. The other ends of pivot arms 204 are pivotally attached to one or more mounts (not shown), by pivot pins 210. The lower end of pawl 200 is pivotally attached to lower pivot arms 203 by pivot pins 205 that pass through one end of arm 203 into the sides of the pawl. The lower pivot arms are pivotally attached to mounts (not shown) by pivot pins 209. Springs 212 are attached to the lower pivot arms on the side of pivot pins 209 opposite pivot pins 205. Thus, pawl 200 is configured to pivot toward or away from blade 64.

Pivot arms 204 and 209 are sized and arranged such that pawl 200 cannot pivot up past the blade without striking the edge of the blade. When the pawl strikes the blade while the blade is rotating, the movement of the blade causes the pawl to continue pivoting upward until the pawl is firmly wedged between the blade and pivot arms, thereby stopping the blade. The contact surface of the pawl may be textured, coated, etc., to enhance the gripping action between the pawl and the blade.

Pawl 200 is biased upward to pivot toward the blade by springs 212, which are anchored, for example, to the saw frame. Thus, when the pawl is free to pivot, springs 212 drive the pawl quickly toward the blade. Similar to the exemplary embodiment described above, fusible member 122 is connected to the pawl to hold it away from the blade. The fusible member is sized to hold the pawl spaced slightly away from the edge of the blade. However, when a sufficient current is passed through the fusible member the fusible member will melt, causing the pawl to pivot toward the blade under the bias of springs 212.

It will be appreciated that many variations to the exemplary embodiment depicted in FIGS. 16 and 17 are possible within the scope of the invention. For example, the pawl may be configured to pivot toward the blade solely due to gravity. Alternatively, springs 212 may be compression springs which normally hold the pawl away from the blade until it is pivoted upward under the force of another spring, an explosive charge, a solenoid, gas pressure, etc. Further, the pawl may be mounted on the other side of the blade to pivot downward into the blade under the force of a spring, an explosive charge, a solenoid, gas pressure, etc.

As described above, the invention provides a reliable system, referred to herein as a safety stop 30, for stopping the cutting tool of a machine upon contact with a user's body. While several exemplary embodiments of safety stop 30 have been depicted and described, it will be appreciated that the specific implementation of the safety stop may vary depending on the particular cutting tool it is installed on. For the purpose of providing additional illustrations of the flexibility and versatility of safety stop 30, exemplary implementations of the safety stop in the context of several common machines will be described briefly.

Figure 18:
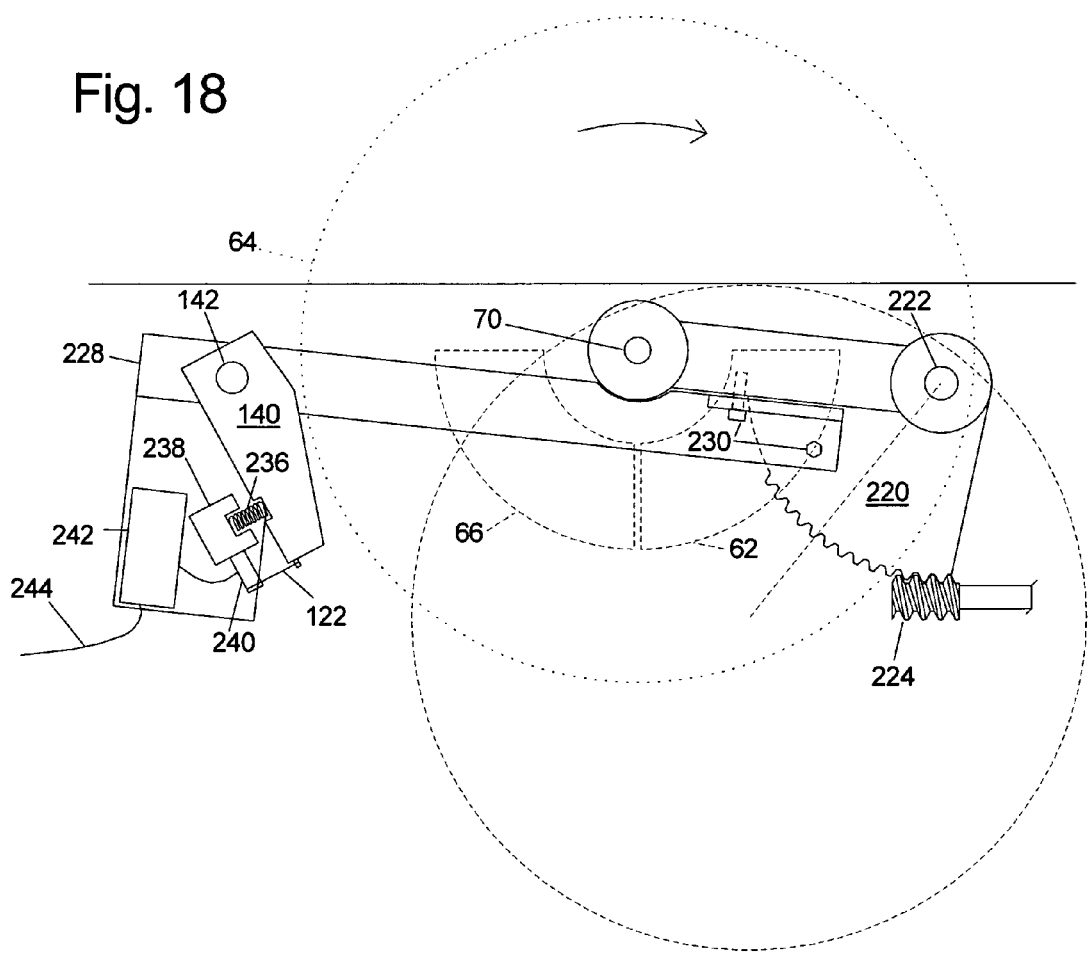
FIG. 18 is a side elevation of an exemplary implementation of a safety stop according to the present invention in the context of a table saw.

FIG. 18 shows safety stop 30 in the context of a typical table saw. Saw blade 64 is mounted to rotate on arbor 70. The arbor extends outward (as viewed in FIG. 18) from a swing arm 220, which pivots about an axle 222 to raise and lower the blade. A worm gear 224 engages an arcuate rack on the swing arm to pivot the swing arm about the axle. Safety stop 30 includes a bracket 228 that attaches to swing arm 220, for example, by one or more bolts 230 extending through the bracket. Disposed on mounting bracket 228 are charging plates 62 and 66. The charging plates are positioned parallel to, and slightly spaced from, blade 64 to create the capacitive shunt between the plates. The mounting bracket may be constructed of an electrically insulating material or include electrical insulation between the bracket and the charging plates.

Mounting bracket 228 extends from the end of swing arm 220 beyond the edge of blade 64. A pawl 140 is pivotally mounted on a bolt 142 extending from the bracket. The free end of the pawl is biased toward the edge of the blade by a compression spring 236. The spring is held in compression between the pawl and a spring block 238, which extends from the bracket. A fusible member 122 is anchored to a pair of contact studs 240. The fusible member is coupled to the pawl and holds it away from the edge of the blade against the spring bias.

An electronics unit 242 contains a contact detector such as first electrical system 38 and second electrical system 88 described above. Shielded cables 60 and 90 extend from the electronics unit to charging plates 62 and 66, respectively. Electronics unit 242 also includes a current generator, such as firing system 115 described above, which is connected to contact studs 240. A power cable 244 extends from electronics unit 242 to a suitable power source (not shown). When the contact detector detects contact between the user's body and the blade, the firing circuit melts the fusible member, thereby releasing the pawl, which engages and abruptly stops the blade.

It should be noted that by placing the pawl and the charging plates on bracket 228 which is attached to the swing arm, the pawl and charging plates move with the blade when it is adjusted. This eliminates the need to reposition the pawl and/or the charging plates whenever the blade is moved. Furthermore, the embodiment of safety stop 30 depicted in FIG. 18 is suitable for easy installation or retrofit of existing table saws which do not currently have a safety stop. The only requirement to retrofit an existing saw is to tap one or more holes into the end of the swing arm to receive bolts 230. The exact positioning of bracket 228 can be adjusted as necessary, for example to extend downward, to fit within the particular saw housing.

While one particular implementation of safety stop 30 has been described in the context of a table saw, it will be understood that any of the implementations and variations described above may also be used in the table saw system. In addition, while safety stop 30 is depicted in the context of one particular table saw configuration, it will be understood that the safety stop may be implemented in any table saw configuration using any of the various embodiments and implementations within the scope of the invention. For example, as shown in FIG. 18, the swing arm is configured to pivot about an axle adjacent the front of many table saws. As a result, when the pawl engages the blade and the angular momentum of the blade is transferred to the swing arm, the swing arm may tend to rise upward depending on its weight and the amount of play in worm gear 224. If the swing arm rises upward the blade will also rise, perhaps increasing the injury to the user. This transfer of angular momentum is unlikely to be a problem where the pawl is mounted to the frame of the saw. However, where the pawl is mounted to the swing arm, it may be desirable to position the pivot point of the swing arm at the rear of the table saw. This configuration can be visualized in FIG. 18 by reversing the direction of blade rotation and moving the brake onto the swing arm. The front of the saw will be on the left as viewed in FIG. 18. In this configuration, the angular momentum of the blade, when transferred to the swing arm by the pawl, would tend to push the blade downward rather than upward. Additionally, the worm gear may be held in place by a spring, permitting the worm gear shift to allow the swing arm to deflect downwardly when the blade is stopped.

In addition, where a plastic bushing is placed between the blade and the arbor as described above, the substantial force created by stopping the blade almost instantly may cause the bushing to deform. Typically, the edge of the mounting hole of the blade will bite into the bushing as the blade attempts to rotate about the pawl. Therefore, if the pawl is mounted at the back of the blade (as shown in FIG. 18), then the blade will tend to move downward into the bushing and away from the user when the pawl engages the blade. It is because of this effect that it is generally preferable to mount the pawl on the swing arm if the pivot is moved to the back of the saw as described above.

Figure 19:
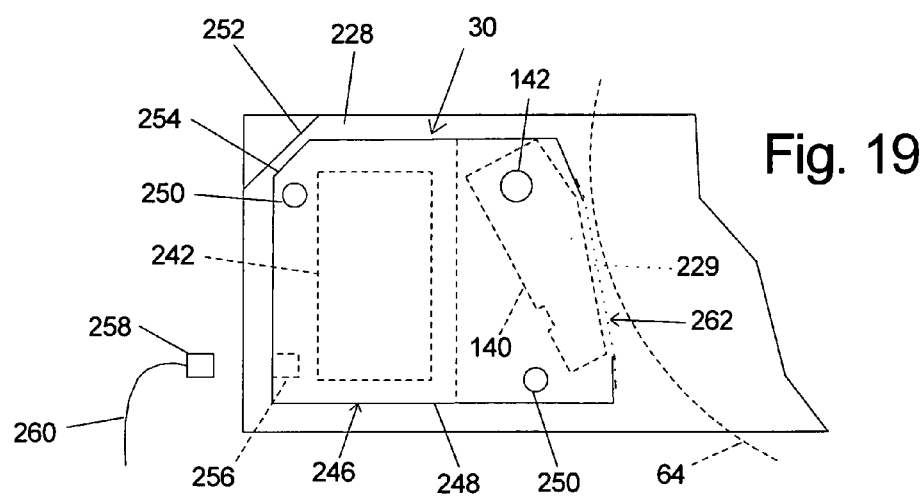
FIG. 19 is a detail view of a cartridge-type safety stop according to the present invention.

As discussed above, in some implementations of safety stop 30, it may be necessary to replace portions of the safety stop (e.g., pawl 140, fusible member 122, etc.) after the safety stop has been triggered to stop the cutting tool. Therefore, in another alternative embodiment of the invention, a portion or all of safety stop 30 is contained in a cartridge or module that can easily be replaced. One example of a cartridge safety stop is shown in FIG. 19, in the context of the table saw implementation described above and depicted in FIG. 18. Cartridge 246 typically includes a frame or housing 248 attachable to a support surface, such as mounting bracket 228, adjacent blade 64. Cartridge 246 may be attachable to the support surface by any suitable mechanism including bolts 250. Alternatively, or additionally, the cartridge may be configured to fit within a socket or other suitable receiver on the mounting bracket. Preferably, the cartridge has a non-symmetrical shape so that it can only be attached to the support surface in the correct orientation. In the exemplary embodiment shown in FIG. 19, the mounting bracket includes a raised shoulder 252 corresponding to a bevel 254 in housing 248 to prevent installation of the cartridge unless the bevel is aligned with the shoulder. It will be appreciated that there are many other ways of ensuring proper orientation of the cartridge within the scope of the invention.

Cartridge 246 also includes an electrical connector 256 configured to operably engage plug 258, attached to cable 260. The cable includes conductors for supplying electrical power to the electronic units, as well as shielded cables 60 and 90 and other input signal lines. The cable may also conduct output signals from the electronics unit, such as a cutoff signal to stop motor assembly 12. Although plug 258 and cable 260 are shown as being freely movable, it will be appreciated that plug 258 may be rigidly mounted to the support surface. Further, plug may be rigidly positioned to ensure that the cartridge is properly aligned and oriented when the connector is engaged with the plug. As a further safety measure, which will be described in more detail below, the electronics unit may be configured to provide an enable signal to the saw power supply, thus preventing use of the saw unless the cartridge was properly installed.

Housing 228 includes an aperture 262 through which the pawl can protrude when released. Alternatively, the pawl can be constructed to be flush with the housing until deployed. In any event, the pawl is pivotally coupled to the housing by bolt 142 to allow the pawl to move toward and engage the blade once contact between the user's body and the blade is detected. Bolt 142 may be mounted to housing 228, or it may be mounted to the support surface to extend through apertures in both the housing and the pawl. It may be useful to cover the pawl and opening with a foil 229, etc., to prevent contamination or inadvertent extension of the pawl.

Typically, cartridge 246 is configured to allow the pawl-to-blade spacing to be adjusted as necessary. For example, the position of the cartridge relative to the blade may be adjustable such as by pivoting or sliding the cartridge relative to one or more of the mounting bolts. In which case, pawl-to-blade spacing may be determined indirectly by measuring the pawl-to-cartridge spacing if desired. Alternatively, the cartridge may be stationary and the pawl may be adjustable within the cartridge. As a further alternative, both the cartridge and pawl are adjustable. Similarly, the position of the mounting bracket may be adjustable relative to the blade.

In the exemplary embodiment, cartridge 246 contains most of safety stop 30 including the pawl, spring, fusible member, contact stud, ground stud, and electronics unit.

Additionally, charge plates 62 and 64 may also be contained in cartridge 246. Placing most of safety stop 30 in the cartridge allows manufacturers to develop improved electronics, additional functions, etc., without requiring major retrofits to the machine. Alternatively, only a portion of safety stop 30 may be placed in the cartridge such as the pawl, spring and fusible member. An advantage of this alternative is that it would reduce the cost of the cartridge. As a further alternative, safety stop 30 may comprise a plurality of cartridges. For example, one cartridge may contain the pawl, spring, fusible member and contact/ground studs, while another cartridge may contain the electronics unit.

Optionally, the cartridge may be provided in different sizes or configurations to accommodate different blade sizes. For example, a longer version of the cartridge shown in FIG. 19 may be used for a smaller diameter blade. Furthermore, different cartridges may be provided for different applications that use different types of blades (e.g., cross-cutting, ripping, plywood, etc.). For example, a first cartridge having a first type pawl may be provided for a first type blade, while a second cartridge having a second, different pawl may be provided for a second, different blade. Alternatively, the electronics of one cartridge may be different from those of another cartridge to allow for different applications (e.g., cutting plastic rather than wood). Additionally, it is within the scope of the invention to use plural cartridges simultaneously to ensure the safety stop responds optimally for each material.

Figure 20:
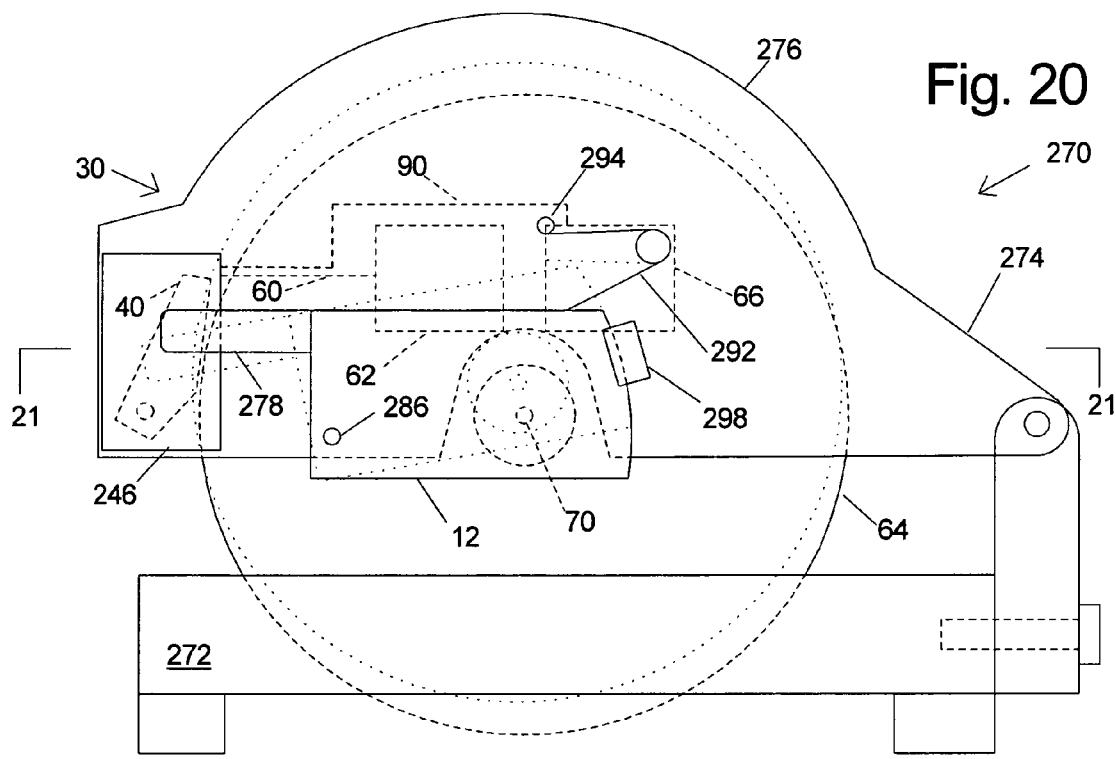
FIG. 20 is a side elevation of an exemplary implementation of a safety stop according to the present invention in the context of a miter saw.
Figure 21:
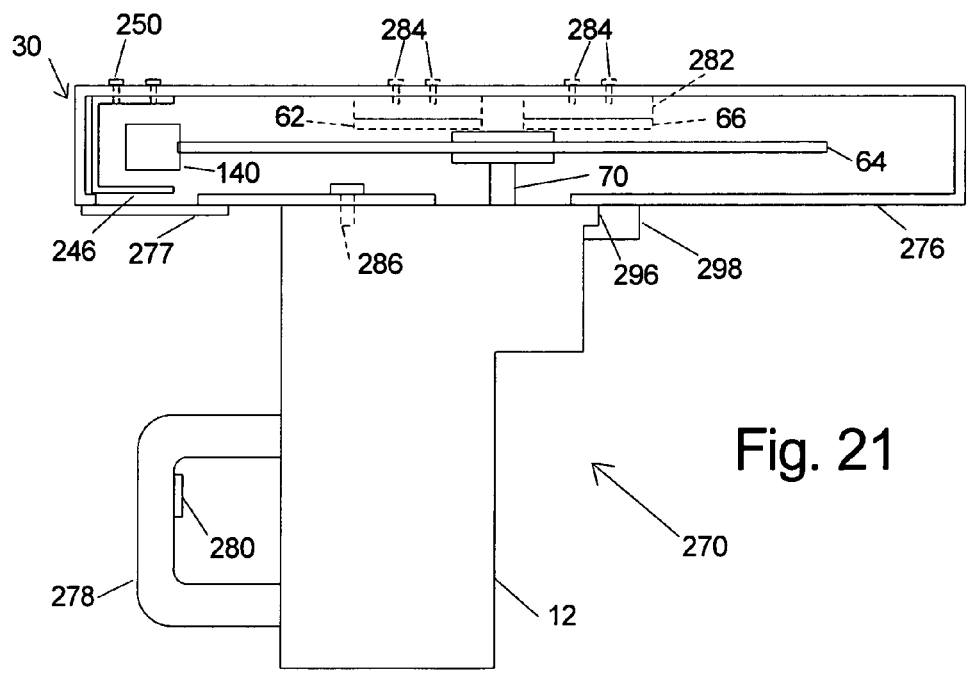
FIG. 21 is a top cross-section view taken along the line 21—21 in FIG. 20.

Turning now to FIGS. 20 and 21, an exemplary safety stop 30 is shown in the context of a miter saw 270 (also commonly referred to as a chop saw). It will be understood that miter saw 270 may be any type of miter saw including a simple miter saw, compound miter saw, sliding compound miter saw, etc. Typically, miter saw 270 includes a base or stand 272 adapted to hold the workpiece to be cut. A swing arm 274 is pivotally coupled to base 272 to allow the arm to pivot downward toward the base. Attached to arm 274 is a housing 276 adapted to at least partially enclose a circular blade 64. A motor assembly 12 is coupled to the housing, and includes a rotating arbor 70 on which the blade is mounted. Motor assembly 12 includes a handle 278 with a trigger 280 operable to run the saw. Blade 64 rotates downward toward swing arm 274. An optional blade guard (not shown) may extend from the bottom of housing 276 to cover any portion of the blade exposed from the housing.

Any of the various configurations and arrangements of safety stop 30 described above may be implemented in miter saw 270. In the exemplary embodiment depicted in FIGS. 20 and 21, safety stop 30 is a cartridge-type system. With the exception of charging plates 62 and 64, both brake system 34 and detection system 32 are contained within cartridge 246. The cartridge is configured to be mounted on the front inside surface of housing 276 by one or more bolts 250. The housing may include a movable panel or door 277 to allow access to the cartridge. A pawl 140 is mounted in the cartridge and is positionable in front of the blade. Charge plates 62 and 66 are attached to the inside wall of housing 276 by one or more mounts 282. The mounts are attached to the housing by any suitable mechanism such as bolts 284, and are configured to position the charge plates parallel to, and closely adjacent, blade 64. As shown in FIG. 21, the spacing between the charge plates and the blade is preferably much less than the spacing between the charge plates and the housing to minimize any parasitic capacitance between the charge plates and the housing. Alternatively, the housing may be constructed from an electrically non-conductive material.

Cables 60 and 90 connect the charge plates to the cartridge. Electrical power for safety stop 30 is provided by a cable (not shown) extending from motor assembly 12. In addition to engaging the pawl with the blade, the electronics unit within cartridge 246 is also configured to interrupt the power to motor assembly 12 when contact between the user's body and the blade is detected.

As discussed above in connection with table saws, a circular blade spinning at several thousand revolutions per minute possesses a substantial amount of angular momentum. Thus, when the pawl engages a circular blade such as is found on miter saw 270 and stops the blade within a few milliseconds, the angular momentum must be transferred to the brake. Because the swing arm of the miter saw is free to pivot in the direction of blade rotation, the angular momentum of the blade may be transferred to the swing arm when the blade is suddenly stopped, causing the swing arm to swing downward. This sudden and forceful downward movement of the swing arm may cause injury to the user if a portion of the user's body is beneath the blade. Therefore, an alternative embodiment of the miter saw implementation of safety stop 30 also includes means for preventing the swing arm from moving downward when the blade is stopped. In addition, the pawl typically is mounted at the front of the miter saw to urge the blade to climb upward away from the user (i.e., deforming the plastic bushing) when engaged by the pawl.

It will be appreciated that there are many suitable means for preventing sudden downward movement of the swing arm. For example, the pivotal connection between the swing arm and the base of the miter saw may be electrically lockable, for example using an electromagnetic leaf spring, to prevent the arm from pivoting. The signal to lock the connection may be provided by the detection system. Alternatively, a shock absorber may be connected between the swing arm and the base to limit the speed with which the swing arm can pivot relative to the base. This arrangement also serves to limit how far the blade moves between the time contact between the blade and user is detected, and the time the blade is stopped by the pawl. While there are many other ways of connecting the swing arm to the base to prevent sudden movement of the arm toward the base, most such arrangements transfer the angular momentum to the swing arm/base assembly. Depending on the weight and balance of the saw, the angular momentum may be sufficient to cause the entire saw to overturn. Therefore, it may be desirable to secure the base to a stable surface with clamps, bolts, etc.

Alternatively, the miter saw can be configured to absorb any angular momentum without allowing the swing arm to move downward. For example, the exemplary embodiment depicted in FIGS. 20 and 21 is configured with a pivotal motor assembly to allow the blade to move upward into the housing upon engagement with the pawl. Motor assembly 12 is connected to housing 276 via pivot bolt 286, allowing the motor assembly to pivot about bolt 286 in the direction of blade rotation. A spring 292 is compressed between the housing and an anchor 294 to bias the motor assembly against the direction of blade rotation. The motor assembly may include a lip 296, which slides against a flange 298 on the housing to hold the end of the motor assembly opposite the pivot bolt against the housing.

When the saw is in use, spring 292 holds the motor assembly in a normal position rotated fully counter to the direction of blade rotation. However, once the pawl is released to engage the blade, the motor assembly and blade to pivot upward against the bias of the spring. In this embodiment, the pawl is positioned at the front of the blade so that the pivot bolt 286 is between the pawl and the arbor. This arrangement encourages the blade to move upward into the housing when stopped. The spring is selected to be sufficiently strong to hold the motor assembly down when cutting through a workpiece, but sufficiently compressible to allow the blade and motor assembly to move upward when the blade is stopped.

While one exemplary implementation of safety stop 30 in the context of a miter saw has been described, the invention should not be seen as limited to any particular implementation as the configuration and arrangement of safety stop 30 obviously may vary among miter saws and applications. For example, the pivoting motor assembly configuration may also be combined with one or more of the other systems described above which prevent the swing arm from pivoting suddenly toward the base. Further, it will be appreciated that the blade and motor assembly may be configured in any of a variety of ways to at least partially absorb the angular momentum of the blade.

Figure 22:
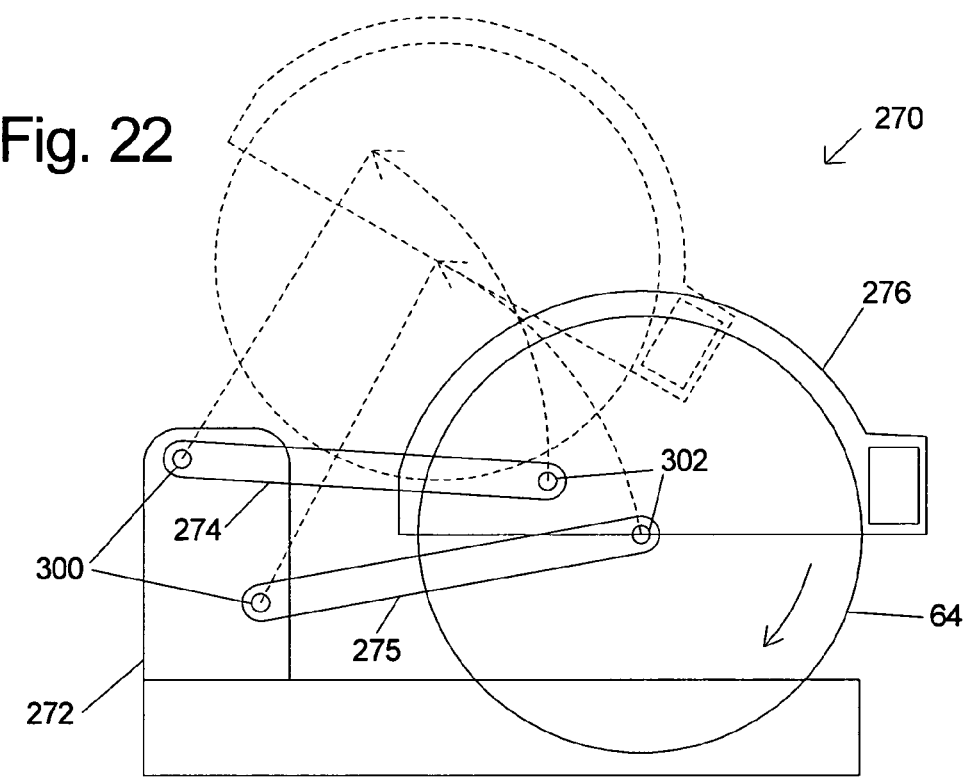
FIG. 22 is an alternative implementation of the safety stop of FIG. 20 in which the miter saw blade is adapted to swing upward when stopped by the pawl.

FIG. 22 shows an alternative configuration of miter saw 270 adapted to absorb the angular momentum of the blade. In this configuration, the miter saw includes two swing arms 275 and 274. One end 300 of each swing arm 275, 274 is connected to base 272, and the opposite end 302 of each swing arm is connected to housing 276, blade 64, and/or the motor assembly (not shown). The position of the swing arms relative to each other may vary depending on the swing arm motion desired. In FIG. 22, swing arm 275 is connected to base 272 somewhat below and forward of swing arm 274. Typically, the motor assembly is rigidly attached to end 302 of swing arm 275, while housing 276 is connected to rotate about end 302 of swing arm 275. End 302 of swing arm 274 is connected only to the housing. This arrangement replicates the motion of the motor assembly and trigger found on many conventional miter saws. Alternatively, the motor assembly may be connected to rotate about end 302 of swing arm 275 along with the housing.

The configuration shown in FIG. 22 causes the housing and/or motor assembly to rotate as the swing arms pivot. Significantly, when the swing arms move upward, the housing and/or motor assembly rotate in the same direction in which the blade rotates during cutting. As a result, when the pawl engages the blade and transfers the angular momentum of the blade to the housing and/or motor assembly, the housing and/or motor assembly tend to rotate in the same direction as the blade. This causes the swing arms to pivot upward, drawing the blade away from the workpiece and the user's body. Thus, as described above, the miter saw configuration illustrated in FIG. 22 is adapted to absorb the angular momentum of the blade and translate that angular momentum into an upward force on the swing arm.

The configuration shown in FIG. 22 and described above illustrates a further alternative embodiment of safety stop 30. Specifically, the safety stop may be configured to move the blade of the cutting tool rapidly away from the user when contact with the user's body is detected in addition to, or instead of, stopping the blade. This alternative embodiment may be implemented in the context of any of the cutting tools described herein. For example, swing arm 220 of the table saw depicted in FIG. 18 may be configured to be disengaged from worm gear 224 when contact is detected, and to pivot downward to pull the blade beneath the upper surface of the saw. A spring (not shown) may be coupled to the swing arm to increase the speed with which it drops downward. It will be appreciated that similar implementations may be configured in the context of all the saws described herein. In the case of the miter saw, the electromagnetic leaf brake discussed above can be used to stop the movement of the arm upon contact with a user. In addition, the release system can be used to release a spring to push the arm upward upon contact of the blade and user. With such systems, it may be unnecessary to abruptly stop the blade to avoid injury.

Figure 23:
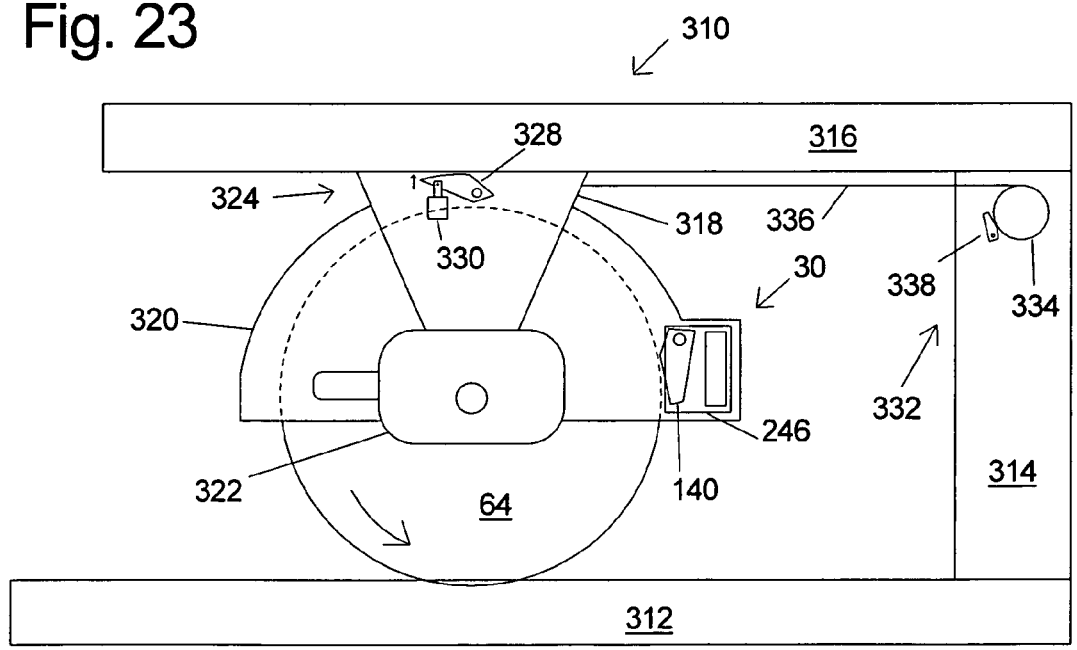
FIG. 23 is a side elevation of an exemplary implementation of a safety stop according to the present invention in the context of a radial arm saw.

FIG. 23 illustrates an exemplary implementation of safety stop 30 in the context of a radial arm saw 310. Typically, radial arm saw 310 includes a horizontal base 312, a vertical support column 314 extending upward from base 312, and a guide arm 316 which extends from column 314 vertically spaced above base 312. A carriage 318 is slidably coupled to the underside of guide arm 316. The bottom end of carriage 318 is connected to the saw housing 320 and motor assembly 322, allowing blade 64 to be pulled across the base to cut workpieces (not shown) supported on the base.

Any of the various configurations and arrangements of safety stop 30 described above may be implemented in saw 310. For example, safety stop 30 may be implemented in a cartridge 246 mountable to housing 320 adjacent the blade. Charge plates 62 and 66 (not shown, may also be mounted within the housing or other suitable locations as described above. Pawl 140 is configured to engage and stop blade 64 upon contact between the blade and the user's body. Although the pawl is shown mounted adjacent the rear of the blade, it may alternatively be mounted adjacent the front of the blade or any other desired location. It should be noted that if the blade is isolated from the arbor by a deformable bushing as described above, then the blade will tend to move upward into the housing if the pawl engages the front of the blade.

Carriage 318 typically is mounted to guide arm 316 to prevent pivoting of the bracket relative to the arm. Therefore, the transfer of the angular momentum of the blade to the housing and guide arm usually does not cause the arm to move toward the user's body upon braking. However, since the user may be pulling the saw toward his or her body when contact is detected, the saw may continue to move toward the user even after safety stop 30 has stopped the blade. This continued movement may cause the stopped blade to be driven over a portion of the user's body (e.g., the user's hand), causing further injury. Thus, it may be desirable to provide an additional brake system to stop movement of the carriage and saw along the guide arm once contact is detected between the blade and the user's body. This brake system may also be used as an alternative to stopping the blade, particularly where the system is configured to draw the carriage backward away from the user upon activation.

It will be appreciated that there are a wide variety of ways to brake the sliding movement of bracket 318 along arm 316. FIG. 23 illustrates just two examples of the many suitable bracket brake configurations within the scope of the invention. One of the illustrated bracket brake configurations includes a pivoting pawl assembly 324. Assembly 324 includes a pawl 328 pivotally coupled to guide bracket 318. An actuator 330 mounted on bracket 318 is operatively coupled to safety stop 30 and configured to engage pawl 328. During normal operation, actuator 330 maintains the pawl spaced-apart from guide arm 316. However, once contact between the blade and the user's body is detected, safety stop 30 sends an actuation signal to actuator 330. The signal sent to actuator 330 may be the same signal that activates firing system 115, or it may be a different signal. In any event, upon receipt of the actuation signal, the actuator drives against pawl 328, causing it to pivot into the guide arm, preventing further movement of the guide bracket forward along the guide arm. The pawl may be constructed or coated with a high friction material such as rubber, and/or may be configured with teeth, etc., to increase its braking action.

The other exemplary braking configuration illustrated in FIG. 23 includes a lockable spool assembly 332. Assembly 332 may be used in place of, or in addition to, wedge assembly 324. In any event, the lockable spool assembly includes a spring-loaded spool 334 mounted on support column 314. One end of a tether or cable 336 is attached to guide bracket 318, while the other end is wound around spool 334. As the user pulls the saw across the base, the spool unwinds, allowing the tether to extend. The spring-loading of the spool ensures that the spool maintains a slight tension on the tether and retracts the tether around the spool when the user pushes the saw back toward the support column. Assembly 332 also includes a spool brake, such as pawl 338, operatively coupled to safety stop 30. Thus, when contact between the blade and the user's body is detected, an actuation signal is sent from safety stop 30 to the spool brake, causing the spool to lock. Once the spool locks, the tether prevents further movement of the saw away from support column 314. In an alternative implementation of spool assembly 332 not shown in FIG. 23, the lockable spool may be contained in, or placed adjacent to, cartridge 246, in which case the tether would run from the spool backward to support column 314.

It will be appreciated that there are many alternative methods, devices, and configurations for stopping the travel of the guide bracket and the saw along the guide arm. Any one or more of these alternatives may be used in place of, or in addition to, the braking configurations illustrated in FIG. 23 and described above.

Figure 24:
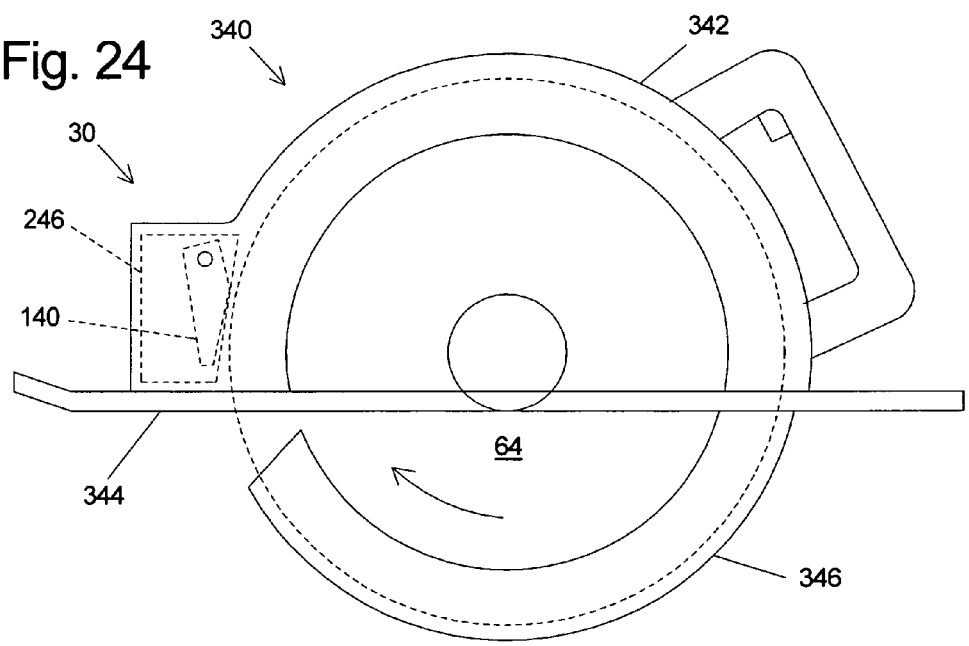
FIG. 24 is a side elevation of an exemplary implementation of a safety stop according to the present invention in the context of a circular saw.

FIG. 24 illustrates safety stop 30 implemented in the context of a hand-held circular saw 340. Typically, circular saw 340 includes a housing 342 that contains a motor assembly (not shown), a guide plate 344, and a retractable blade guard 346. Blade 64 is coupled to the motor assembly by arbor 70. Safety stop 30 may be implemented on saw 340 according to any of the embodiments and configurations described above. In the exemplary implementation depicted in FIG. 24, the safety stop is illustrated as a cartridge-based system. Cartridge 246 includes a pawl 140, and is attachable to housing 342 so that the pawl may engage the blade. Charge plates (not shown) may be mounted to an inner surface of the housing adjacent the blade or any other location suitable to capacitively couple the input signal across the blade. The cartridge and pawl are shown as mounted adjacent the front of the blade to avoid interference with blade guard 346. Alternatively, the pawl and cartridge may be mounted adjacent any other portion of the blade.

While safety stop 30 has been described above in the context of table saws, miter saws, radial arm saws, circular saws, it will be appreciated that similar implementations of safety stop 30 will also be suitable for virtually any type of machine using a rotating blade with a perimetrical cutting edge.

Figure 25:
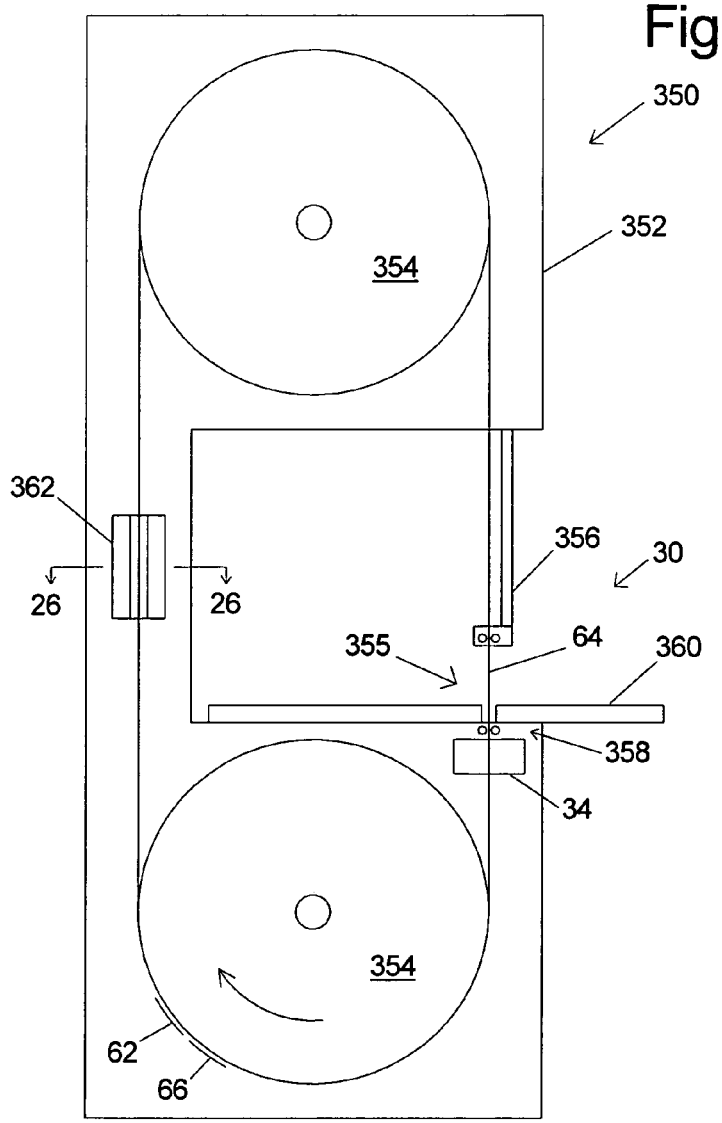
FIG. 25 is a side elevation of an exemplary implementation of a safety stop according to the present invention in the context of a band saw.

As a further example of the versatility and multi-configurability of the invention, FIG. 25 illustrates another embodiment of safety stop 30 in the context of a band saw 350. Typically, band saw 350 includes a main housing 352 enclosing a pair of vertically spaced-apart wheels 354. The perimeter of each wheel 354 is coated or covered in a high-friction material such as rubber, etc. A relatively thin, continuous loop blade 64 tightly encircles both wheels. A workpiece is cut by passing it toward blade 64 in a cutting zone 355 between wheels 354. An upper-blade guide assembly 356 and a lower blade-guide assembly 358 maintain the revolving blade in a stable path within cutting zone 355. The workpiece is passed toward the blade on a table 360, which forms the bottom of the cutting zone.

The blade should be electrically insulated from the main housing, which usually is grounded. Thus, blade guide assemblies 356 and 358, which may include ball-bearing guides and/or friction pads, etc., are constructed to electrically insulate the blade from the main housing. In addition, the high-friction coating on wheels 350 electrically insulates the blade from wheels 354. Alternatively, the wheels may be constructed of electrically non-conductive material.

Charge plates 62 and 66 may be arranged in a variety of ways depending on the application and the space constraints within the main housing. Two possible arrangements are illustrated in FIG. 25. In the first arrangement, charge plates 62 and 66 are disposed closely adjacent the blade as it rides along one of the wheels 354. The charge plates may be formed in an arc to match the perimeter of the wheel and maintain a constant spacing with the blade. This arrangement has the advantage of easily maintaining a constant blade-to-charge plate spacing since the blade is held in a constant path against the perimeter of the wheel. The charge plates may be connected to the main housing via a non-conductive mount to maintain electrical insulation from the housing.

Figure 26:
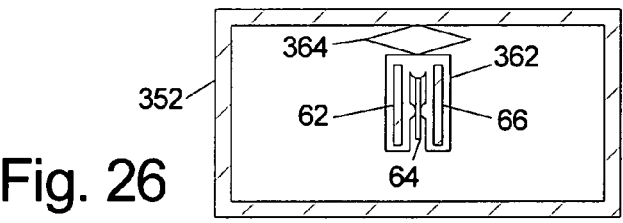
FIG. 26 is a section view taken along the line 26—26 in FIG. 25 and showing an alternative charge plate arrangement according to the present invention.

Another of the many possible arrangements for the charge plates includes a charge plate block 362 which is configured to extend along the blade as it travels between wheels 354. As can best be seen in the detail view of FIG. 26, the charge plate block includes charge plates 62 and 66. In the depicted implementation, the charge plate block has a substantially C-shaped cross-section sized to fit around the sides and back edge (i.e., non-toothed edge) of the blade. The charge plate block is mounted on main housing 352 and resiliently biased, such as by one or more springs 364, toward the moving blade. Since blade 64 may tend to move or deflect slightly in its path, springs 364 ensure that the charge plate block is able to move along with blade. Charge plate block 362 typically is made of a durable, electrically non-conductive material such as ceramic, plastic, etc. Charging plates 62 and 66 are disposed on or within the charge plate block. Although the charging plates are illustrated as being disposed on opposite sides of blade 64, the charging plates may alternatively be on the same side of the blade. The self-aligning configuration of the charge plate block ensures that the blade-to-charging plate spacing is substantially constant despite the motion of the blade.

Figure 27:
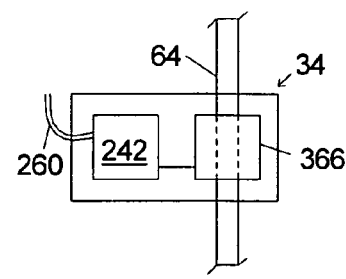
FIG. 27 is a schematic view of an alternative brake system according to the present invention.

Safety stop 30 may include a brake system 34 having one or more pawls (not shown) configured to engage and stop the blade upon detection of contact between the blade and the user's body. The pawl(s) may be arranged to engage the teeth of the blade or the sides of the blade as described above. Due to the high friction, high tension fit of the blade over the wheels, it may be necessary to stop one or both wheels as well as the blade. Thus, the pawl(s) may alternatively be arranged to engage one or both wheels 354. However, due to the relatively high mass of typical bandsaw wheels 354, the angular momentum of the spinning wheels may be substantial, requiring a large amount of force to stop the blade and wheels virtually instantaneously. Therefore, a further alternative embodiment of brake system 34 is illustrated in FIG. 27. As described below, alternative brake system 34 is configured to sever blade 64 upon detection of contact between the user and the blade. By severing the blade, the tension fit of the blade around wheels 354 is released, allowing the blade to be stopped without stopping the wheels.

As can best be seen in the detail view of FIG. 27, alternative brake system 34 includes an explosive cable-or bolt-cutting device 366 positionable adjacent blade 64 to sever the blade upon receipt of an activation signal. Suitable cable cutting devices 366 are available from a variety of sources, including Cartridge Actuated Devices, Inc., of Fairfield, N.J. The size and configuration of device 366 may vary depending on such factors as the size and width of blade 64, the blade material, blade speed, etc. Typically, cutting device 366 will be positioned closely adjacent the underside of table 360 to block the continued downward movement of the blade after it is severed. An electronics unit 242 similar to those described above is operatively coupled to device 366 to transmit an activation signal to the device once contact between the user's body and the blade is detected by the electronics unit. Device 366 then severs the blade virtually instantaneously, thereby releasing the tension fit of the blade around wheels 354. Once severed, the blade substantially stops moving even though wheels 354 continue to turn. As described above, the safety stop may optionally be configured to shut off the motor to band saw 350 as well as to sever the blade. Additionally, one or more pawls (not show) may be configured to engage and stop the blade at the same time device 366 severs the blade, thereby ensuring the blade does not continue to move after being severed.

Figure 28:
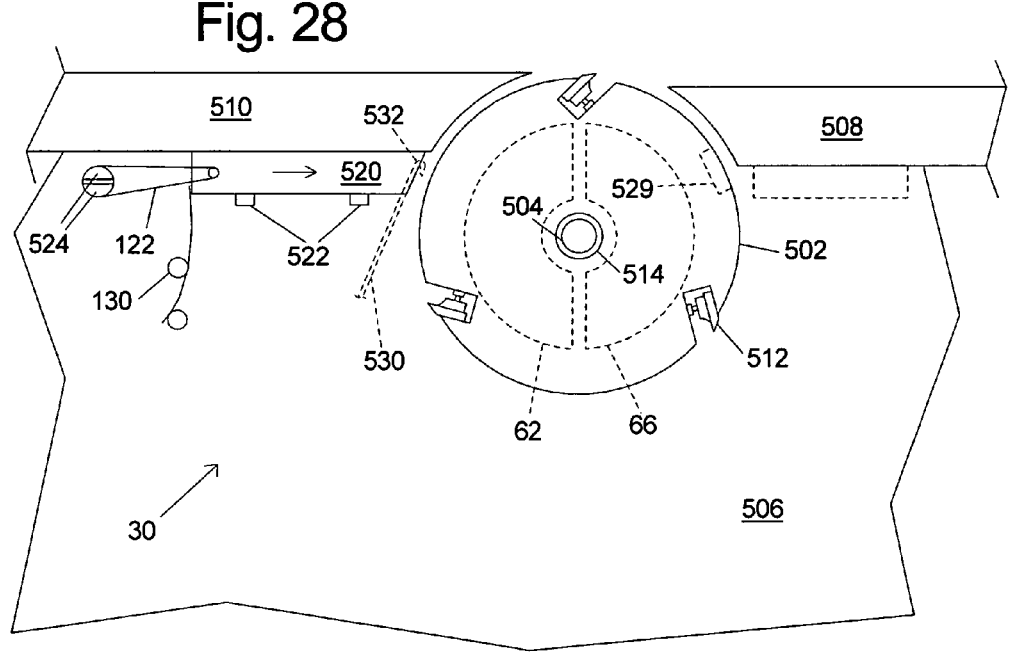
FIG. 28 is a side elevation of an exemplary implementation of a safety stop according to the present invention in the context of a jointer.

In addition to cutting machines using toothed blades, several common machines such as jointers, planers, etc., use generally cylindrical cutting heads having one or more elongate blades mounted on the outer surface of the cutting head. In operation, the cutting head is rotated about its cylindrical axis. When a workpiece is passed across the cutting head, the blades make wide cuts into the adjacent surface of the workpiece. As with the cutting machines described above, machines using cylindrical cutting heads may also cause severe injury if the blades come into contact with the user's body during operation. Therefore, FIG. 28 shows exemplary configurations of the safety stop for use on a jointer 500 to prevent severe injury to a user. For clarity, many of the components of safety stop 30 are not shown in FIG. 28 since they are similar to the safety stop components described above in the context of other cutting machines.

Jointer 500 includes a generally cylindrical cutterhead 502 mounted to rotate on an arbor 504. The arbor typically is mounted in one or more bearing assemblies (not shown) and rotationally driven by a motor assembly (not shown), which is coupled to the arbor either directly or by a belt-and-pulley system. The cutterhead is mounted in a main frame assembly 506 to extend upward in the space between infeed table 508 and outfeed table 510. A workpiece is cut by sliding it along infeed table 508, past the cutterhead and onto outfeed table 510. Typically, the vertical positions of the infeed and outfeed tables are independently adjustable to control the depth of cut into a workpiece.

The cutterhead is usually constructed of metal, such as steel, and typically includes three knife blades 512 mounted to extend above the surface of the cutterhead. It will be appreciated that fewer or more knife blades may be used and that the utility of safety stop 30 is not limited by the number of blades on cutterhead 502. One or more electrically non-conductive bushings 514 are placed between the cutterhead and arbor to insulate the cutterhead and blades from frame 506. Charge plates 62 and 66 may be placed adjacent the cutterhead to couple the signal generated by first electrical system 38 across the cutterhead. In FIG. 28, the charge plates (shown in dashed lines) are mounted adjacent one flat end of the cutterhead. Alternatively, the arbor may be insulated from the frame and the charge plates may be positioned around the arbor as described above in connection with FIG. 5.

Due to the relatively few blades, first contact between the user's body and the cutterhead may be on one of the blades or on the surface of the cutterhead itself. However, the blades and cutterhead are electrically coupled so that any contact with the user's body is detected regardless of whether or not it occurs on the blades. Once contact is detected, a brake system is actuated to quickly stop the rotation of cutterhead 502.

The brake system may include a pivotal pawl disposed to swing into and engage one of the blades as described above. The pawl may be constructed to be generally as wide as the cylindrical length of the cutterhead to engage the entire length of the blade rather than a relatively small portion of the blade. Typically, the pawl will not stop rotation of the cutterhead until a blade strikes the pawl because the surface of the cutterhead is relatively smooth. The pawl may be shaped to extend into the slots in the cutterhead that house the blades, thereby ensuring the pawl engages the cutterhead itself, in addition to the blade.

Instead of the pivotal pawl system just described, FIG. 28 shows an alternative pawl configuration which includes a plate 520 supported on sliding blocks 522 beneath outfeed table 510. When plate 520 is slid into contact with cutterhead 502, the plate engages the next passing blade, stopping rotation of the cutterhead. Plate 520 may be constructed of any suitable material capable of stopping the cutterhead including metal, plastic, etc. The plate may be slid against the cutterhead by a spring 130 held by a fusible member 122. The fusible member is looped around a pair of contact studs 524 connected to a firing system (not shown) so that when contact with the user's body is detected, the fusible member is melted and spring 130 is released. It should be noted that the spring is released through a compound mechanism to allow for a stronger spring without increasing the size of the fusible member. While plate 520 is shown positioned on the upper, back side of the cutterhead, the plate may alternatively be positioned at any point adjacent the cutterhead and beneath the infeed and outfeed tables. For instance, the plate could be placed under the infeed table as shown in dashed lines. In addition, plural plates may be used and positioned at various locations such as at the front and back of the cutterhead.

For a typical cutterhead having three blades and rotating at approximately 5000 rpm, the cutterhead makes a complete rotation in approximately 12 ms, and contact between a first blade and the next will be approximately 4 ms. Therefore, the cutterhead is preferably stopped in less than 8 ms and more preferably in less than 4 ms from first contact with the user's body. In the former case, no more than two blades would contact the user, while in the latter case, no more than one blade would contact the user. However, longer stopping times may also be acceptable. It will be appreciated that to optimize the performance of the safety stop, the position of the pawl around the cutterhead may be adjusted-based on the time between contact detection and pawl engagement—to ensure that the pawl engages the cutterhead just in front of a passing blade rather than just behind one. Otherwise, the cutterhead would continue to rotate until the next blade strikes the pawl. Alternatively, the cutterhead may be constructed with one or more slots, such as shown in dashed lines at 529, along its length adapted to receive the pawl. Then, if the pawl engaged the cutterhead just behind a passing blade, the cutterhead would only rotate to the next passing slot rather than the next blade.

In addition to the pawl-based brake system described above, FIG. 28 also shows an alternative system configured to cover the blades to prevent them from causing injury to the user. Specifically, the alternative system includes a substantially flexible sheet material 530 such as plastic, rubber, metal foil, metal sheet, etc. Material 530 includes a hook 532 adapted to engage any of the blades 512. When hook 532 is pushed against cutterhead 502, the next passing blade catches the hook, causing material 530 to wrap around the cutterhead as it rotates. Thus, the blades are covered by material 530, which protect the user from serious injury. The hook may be moved into contact with the cutterhead by being mounted to the front of plate 520 or other actuator assembly. Typically, the outer surface of hook 532 is rounded or beveled to prevent injury to the user when the hook is pulled around the cutterhead. Material 530 may be stored on a spool or may hang free beneath the hook until wrapped around the cutterhead. Preferably, material 530 is long enough to completely cover all blades. Alternatively, the end of material 530 opposite the hook may be anchored to stop the cutterhead before it makes a full rotation. Additionally or alternatively, the jointer motor assembly may be shut off to stop rotation of the cutterhead. A similar system can be implement for circular blade saws to cover the sharp teeth.

Similarly to jointers, planers also use cylindrical cutterheads having one or more knife blades along their surface. Typically, the cutterhead is mounted above a bed having one or more feed rollers, and a workpiece is passed along the rollers beneath the cutterhead. It will be appreciated that safety stop 30 may be adapted for use with planers using configurations similar to those described above in connection with jointers. Accordingly, an implementation of safety stop 30 in the context of planers will not be separately described. In addition, it will be appreciated that safety stop 30 may similarly be adapted for use with other machines using rotating cutting heads, including shapers, routers, etc.

While safety stop 30 has been described above as configured to detect contact between the blade and the user's body, it will be appreciated that safety stop 30 may be additionally, or alternatively, configured to detect other dangerous conditions. For example, safety stop 30 may be configured to detect potential kickback by monitoring the blade speed or deflection. If a rapid decrease in blade speed (while under power) or a substantial deflection of the blade is detected, the brake system would be triggered to stop the blade. Blade speed may be measured by any suitable device such as a tachometer, etc. Blade deflection may be detected using micro-switches positioned adjacent the blade, electrical detectors (e.g., optical, resistive, capacitive, magnetic, etc.) adjacent the blade, or the like. Other dangerous conditions may also be monitored. Indeed, it may be desirable for safety stop 30 to trigger upon the occurrence of any of multiple conditions.

It should be understood that the detection and brake systems of the present invention and components thereof are independently useful. For instance, the present brake system could be utilized with a glove-based contact system as found in meat skinning machines and described in the background, or any other suitable contact detection system. Similarly, many different brake systems can be used with a contact detection system constructed according to the present invention. Further, the fusible member and firing system may be used in any system requiring the rapid release of a biased structural member.

I claim:

1. A saw comprising:
a base configured to rest on a generally horizontal surface to support the saw during operation;
a work surface supported by the base above the generally horizontal surface on which a workpiece may be cut;
a rotatable blade adapted to cut a workpiece on the work surface, where the blade has an angular momentum when rotating;
an axis around which the blade rotates;
a motor to drive the blade;
a detection system configured to detect a dangerous condition between a person and the blade; and
a reaction system including a brake to decelerate the blade upon detection of the dangerous condition between the person and the blade, where the reaction system is configured to use at least a fraction of the angular momentum of the blade to generate a force tending to urge the axis around which the blade rotates away from the work surface when the brake decelerates the blade.

2. The saw of claim 1, where the brake is configured to stop the rotation of the blade.

3. The saw of claim 1, where the saw is a table saw, where the blade is adapted to extend at least partially up through the work surface, and where the reaction system tends to urge the axis around which the blade rotates downward relative to the work surface.

4. A woodworking machine comprising:
a base configured to rest on a generally horizontal surface to support the machine during operation;
a work surface supported by the base above the generally horizontal surface on which a workpiece may be cut;
a rotatable blade adapted to cut a workpiece on the work surface, where the blade has angular momentum when rotating;
an axis around which the blade rotates;
a motor to drive the blade;
a detection system adapted to detect a dangerous condition between a person and the blade; and
a reaction system adapted to use at least a fraction of the angular momentum of the blade to generate a force tending to urge the axis around which the blade rotates away from the work surface upon the detection of the dangerous condition.

5. The woodworking machine of claim 4, where the woodworking machine is a table saw, where the support structure includes a table, where the reaction system is positioned below the table, and where the reaction system is adapted to urge the blade in a direction downward relative to the table.

6. The woodworking machine of claim 4, where the woodworking machine is a miter saw, and further comprising a support arm moveable relative to the base, where the blade is mounted on the support arm, and where the reaction system is adapted to urge the blade upward relative to the base.

7. The woodworking machine of claim 4, where the reaction system is further adapted to stop the blade.

8. A miter saw comprising:
a support structure having a cutting zone;
a swing arm above and pivotally attached to the support structure;

a rotatable blade supported by the swing arm so that the blade may move into the cutting zone, where the blade has angular momentum when rotating;

a handle associated with the swing arm and adapted so that a user may pivot the swing arm and blade into the cutting zone;

a motor adapted to drive the blade;

a detection system to detect a dangerous condition between a person and the blade; and a reaction system adapted to create an impulse against movement of the blade into the cutting zone upon detection by the detection system of the dangerous condition between the person and the blade, where the impulse is created due at least partially to the angular momentum of the blade.

9. The miter saw of claim 8, where the reaction system includes a brake mechanism adapted to engage the blade, and where the engagement of the brake mechanism with the blade creates the impulse against movement of the blade into the cutting zone.

10. A woodworking machine comprising:

a frame adapted to support workpieces in a cutting region;

a movable cutting tool supported by the frame and configured to cut workpieces in the cutting region;

a motor configured to drive the cutting tool;

a detection system configured to detect one or more dangerous conditions between a person and the cutting tool; and a brake mechanism including at least one braking component configured to engage the cutting tool upon detection of at least one of the dangerous conditions by the detection system, where engagement of the braking component with the cutting tool tends to urge the cutting tool in a direction away from the cutting region.

11. A woodworking machine comprising:

a frame adapted to support workpieces in a cutting region;

a movable cutting tool supported by the frame and configured to cut workplaces in the cutting region;

a motor configured to drive the cutting tool;

a detection system configured to detect one or more dangerous conditions between a person and the cutting tool; and a brake mechanism including at least one braking component configured to engage the cutting tool upon detection of at least one of the dangerous conditions by the detection system, where engagement of the braking component with the cutting tool tends to urge the cutting tool in a direction away from the cutting region, where the rotating cutting tool has angular momentum, and where the braking component is configured to transform at least a portion of the angular momentum of the cutting tool into a force on the cutting tool in a direction away from the cutting region.

* * * * *